(12) United States Patent
Kubo et al.

(10) Patent No.: US 8,085,443 B2
(45) Date of Patent: Dec. 27, 2011

(54) ORIGINAL READING DEVICE

(75) Inventors: Hiroaki Kubo, Muko (JP); Nobuhiro Mishima, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 425 days.

(21) Appl. No.: 12/369,617

(22) Filed: Feb. 11, 2009

(65) Prior Publication Data

US 2009/0316166 A1    Dec. 24, 2009

(30) Foreign Application Priority Data

Jun. 19, 2008  (JP) .................................. 2008-160189

(51) Int. Cl.
*H04N 1/409* (2006.01)
*H04N 1/60* (2006.01)
*H04N 1/38* (2006.01)

(52) U.S. Cl. ......... 358/3.26; 358/1.9; 358/463; 358/464

(58) Field of Classification Search .................. 358/3.26, 358/1.9, 463, 464
See application file for complete search history.

(56) References Cited

FOREIGN PATENT DOCUMENTS

| JP | 2000-78409 | 3/2000 |
|---|---|---|
| JP | 2002-271631 | 9/2002 |
| JP | 2003-8846 | 1/2003 |
| JP | 2003-101737 | 4/2003 |
| JP | 2004-297302 | 10/2004 |
| JP | 2005-94685 | 4/2005 |

OTHER PUBLICATIONS

Japanese Notification of Reasons for Refusal mailed Jun. 15, 2010 directed to counterpart application No. JP-2008-160189; 9 pages.

*Primary Examiner* — Charlotte M Baker
(74) *Attorney, Agent, or Firm* — Morrison & Foerster LLP

(57) ABSTRACT

An original reading device corrects line noise when performing original image reading by a sheet-through method, even if line noise appears due to a piece of debris simultaneously influencing all color sensors. Background plates (33) have different densities and a background plate switching motor (37) switches between the background plates in order. Before the original reaches a reading position, an image of each background plate is read to generate correction data. Image data is generated by reading an image of the original when it has reached the reading position. A noise address is detected using the correction data and/or image data. The correction data is used to calculate an influence value indicating a level of influence of a dirtiness source inferred to exist at an area corresponding to the noise address. In the image data, a line noise portion indicated by the noise address is corrected using the influence value.

18 Claims, 16 Drawing Sheets

ORIGINAL READING DEVICE

This application is based on application No. 2008-160189 filed in Japan, the content of which is hereby incorporated by reference.

BACKGROUND OF THE INVENTION

1. Field of the Invention

The present invention relates to an original reading device that reads an original by a sheet-through method, and in particular to technology for detecting and appropriately correcting noise origination from debris that has adhered to an original platen.

2. Description of the Related Art

Original reading devices included in copiers, facsimile devices, scanner devices, etc. often employ a sheet-through type of original reading method in which an optical system such as a reading line sensor is fixed in place, an original is conveyed by an automatic original conveying device so as to pass over the line sensor, and image data corresponding to the image of the original is generated.

This sheet-through type of original reading method has advantages such as improving reading speed over a method in which the optical system is moved while reading an image. On the other hand, if debris adheres to the original platen over the line sensor, line-shaped noise appears along the direction in which the original is scanned.

Color line sensors normally include three sensors, that is to say, one for each color, and the three colors of sensors are arranged parallel to each other at a specified pitch of roughly several pixels. Therefore, in the case of line noise appearing due to small-diameter debris, the specified pitch can be used to correct the data that corresponds to the line noise portion, based on data from a color sensor over which debris has not adhered.

Patent documents 1 to 5 are examples of conventional technology for correcting line noise.

Patent document 1 (Japanese Unexamined Patent Application No. 2000-78409) discloses an image reading device that includes two reading parts. The image reading device detects pixels that have different read values, compares each of the read values to the read values of surrounding pixels, and determines a read value that has a large difference from the read values of surrounding pixels to be noise. Regardless of whether the noise included in read values is black or white, read values that are largely different from the color in the surrounding area are determined to include noise and are eliminated, thus obtaining read values that do not include noise.

Patent document 2 (Japanese Unexamined Patent Application No. 2002-271631) discloses an image reading device which includes two reading units that have different spectral sensitivities and are offset in the sub-scanning direction of the manuscript. The image reading device compares density values resulting from the reading performed by the two reading parts, judges whether an edge component in the main scanning direction is included in one of the reading results, and detects a noise component based on the comparison result and judgment result. According to patent document 2, if the reading result includes a noise component due to the influence of a foreign object such as debris, the noise component is detected based on the comparison result and judgment result, thereby eliminating the need to include redundant reading parts that have a spectral sensitivity characteristic for reading color image information.

Patent document 3 (Japanese Unexamined Patent Application No. 2005-94685) discloses an image formation device that includes reading elements corresponding to the colors red, green, and blue, and a monochrome reading element. A full-color scanner that uses a sheet-through method can output high-quality image data when reading a monochrome image, and even if debris is present in the optical reading path, black lines can be precisely and effectively removed from monochrome image data and color image data, thus enabling high-quality image output.

Patent document 4 (Japanese Unexamined Patent Application No. 2003-8846) discloses an original reading device that exposes an original to light to read information before the original has reached a reading position, and obtaining and storing image data pertaining to one of a plurality of colors. When performing original reading, the original reading device retrieves the stored image data and performs color correction on the data obtained by the original reading, with respect to the color of the stored image data. This structure enables correcting color lines when performing full-color reading by a sheet-through method, without needing to provide the original feeding device with additional mechanisms.

Patent document 5 (Japanese Unexamined Patent Application No. 2004-297302) discloses an image reading device that detects the presence of line images for each color. The structure recited in patent document 5 enables reliably detecting line images originating from dust, dirt, etc. in a color image obtained by reading an original.

However, in the above method that makes use of the pitch, all of the colors of sensors may simultaneously be affected by debris that is larger than the pitch, or even by small-diameter debris if the pitch between the different colors of sensors has been reduced. In such cases, the line noise portion of data cannot be properly corrected.

SUMMARY OF THE INVENTION

An object of the present invention is to provide an original reading device, original reading program, original reading method, and image formation device that can, under a predetermined condition, correct line noise when reading an image of an original by a sheet-through method, even if such line noise has appeared due to debris etc. that simultaneously influences all colors of sensors.

In order to achieve the above object, one aspect of the present invention is an original reading device that moves an original by a sheet-through method and generates image data corresponding to an image of the original, including: a plurality of background plates having mutually different densities; a background plate switcher operable to automatically switch between the plurality of background plates one-by-one and in order, so as to be a background at a reading position in the sheet-through method; a reader operable to (i) generate a correction data piece for each of the background plates by, when the original is located away from the reading position, performing an image reading operation each time the switcher switches between the background plates, and (ii) generate the image data by reading the image of the original by the sheet-through method when the original has reached the reading position; a detector operable to, based on one or both of the image data and the correction data pieces for the background plates, detect a noise address indicating a generation position where line noise is generated continuously in a moving direction of the original due to a dirtiness source on an original platen during original reading; a calculator operable to calculate an influence value based on the correction data pieces for the background plates, the influence value indicating a level of influence of the dirtiness source inferred to exist at an area of the reading position that corresponds to the detected noise address; and a corrector operable to correct a line noise portion of the image data with use of the influence value, the line noise portion being indicated by the detected noise address.

In order to achieve the above object, another aspect of the present invention is a computer-readable recording medium having recorded thereon an original reading program for causing original reading processing to be performed by an original reading device that moves an original by a sheet-through method and generates image data corresponding to an image of the original, the original reading device including: a plurality of background plates having mutually different densities; and a background plate switcher operable to automatically switch between the plurality of background plates one-by-one and in order, so as to be a background at a reading position in the sheet-through method, and the original reading program causing the original reading device to perform the steps of: (i) generating a correction data piece for each of the background plates by, when the original is located away from the reading position, performing an image reading operation each time the switcher switches between the background plates, and (ii) generating the image data by reading the image of the original by the sheet-through method when the original has reached the reading position; detecting, based on one or both of the image data and the correction data pieces for the background plates, a noise address indicating a generation position where line noise is generated continuously in a moving direction of the original due to a dirtiness source on an original platen during original reading; calculating an influence value based on the correction data pieces for the background plates, the influence value indicating a level of influence of the dirtiness source inferred to exist at an area of the reading position that corresponds to the detected noise address; and correcting a line noise portion of the image data with use of the influence value, the line noise portion being indicated by the detected noise address.

In order to achieve the above object, another aspect of the present invention is an original reading method used in an original reading device that moves an original by a sheet-through method and generates image data corresponding to an image of the original, the original reading device including: a plurality of background plates having mutually different densities; and a background plate switcher operable to automatically switch between the plurality of background plates one-by-one and in order, so as to be a background at a reading position in the sheet-through method, and the original reading method including the steps of: (i) generating a correction data piece for each of the background plates by, when the original is located away from the reading position, performing an image reading operation each time the switcher switches between the background plates, and (ii) generating the image data by reading the image of the original by the sheet-through method when the original has reached the reading position; detecting, based on one or both of the image data and the correction data pieces for the background plates, a noise address indicating a generation position where line noise is generated continuously in a moving direction of the original due to a dirtiness source on an original platen during original reading; calculating an influence value based on the correction data pieces for the background plates, the influence value indicating a level of influence of the dirtiness source inferred to exist at an area of the reading position that corresponds to the detected noise address; and correcting a line noise portion of the image data with use of the influence value, the line noise portion being indicated by the detected noise address.

According to the above, an influence value indicating a level of influence of a dirtiness source such as debris is calculated based on the correction data for the background plates, and the influence value is used to correct line noise. This obtains the superior effect of being able to perform line noise correction even if line noise appears due to debris etc. that simultaneously influences all colors of sensors.

Also, the background plates having mutually different densities are set one-by-one as a background, images thereof are read before the original has reached the reading position to generate correction data for the background plates, and a noise address is detected based on the correction data. Due to the fact there is no influence from the original and no dependency on the color of the debris, this is more beneficial and has a higher degree of detection precision than a case of detecting a noise address based on image data of the original.

In the original reading device, the reader may generate the correction data pieces for the background plates as data pertaining to full-color color components, the calculator may calculate an influence value for each of the color components, and the corrector may include: a pseudo noise data generator operable to generate pseudo noise data by performing an operation on each color component of a noise-free portion of the image data with use of the influence values, the noise-free portion being a portion of the image data excluding the line noise portion, and the pseudo noise data simulating a state in which the noise-free portion of the image data has been influenced by the dirtiness source; a judging part operable to focus on pixels in the line noise portion of the image data one-by-one, and for each color component of the pixel being focused on, judge whether the level of influence indicated by the influence value is lower than a level of influence indicated by a predetermined specified value; a search part operable to, if the judging part has judged that the level of influence indicated by the influence value for one or more color components of the pixel being focused on is lower than the level of influence indicated by the predetermined specified value, search the pseudo noise data to find a pixel or predetermined unit of area that matches or approximates values of the image data corresponding to the one or more color components whose level of influence was judged to be lower than the influence value indicated by the predetermined specified value; and a replacing part operable to correct the line noise portion of the image data by replacing all color components of the pixel being focused on with color components of data in the noise-free portion that corresponds to the found pixel or predetermined unit of area.

According to this structure, pseudo noise data is generated by performing an operation on the noise-free portion of data using the influence values. Based on the value of image data of a color component whose level of influence is lower than a specified value, the pseudo noise data is searched to find data that is to replace all color components of the pixel being focused on, thereby correcting the line noise portion of data more precisely than in conventional technology.

In the original reading device, the corrector further may include a prohibiting part operable to prohibit correction if the judging part has judged that none of the level of influences indicated by the influence values for the color components of the pixel being focused on are lower than the level of influence indicated by the predetermined specified value.

According to this structure, correction is prohibited if none of the color components have a level of influence lower than the specified value. This structure prevents correction in a case where the possibility of erroneous correction is high, thus reducing the occurrence of correction errors.

In the original reading device, the plurality of background plates may include a white background plate and a black background plate, each influence value calculated by the calculator may be composed of a background visibility rate T indicating a degree to which a background image can be seen through the dirtiness source, and a density component value D indicating a value of a component of light that is not influenced by the background image, background visibility rate T={(data of the line noise portion of the correction data piece for the white background plate)−(data of the line noise portion of the correction data piece for the black background plate)}/{(average data for an entirety of the correction data piece for the white background plate)−(average data for an entirety of the correction data piece for the black background plate)}, density component value D={(data of the line noise portion of the correction data piece for the white background plate)−(average data for the entirety of the correction data piece for the white background plate)×background visibility rate T}, and the pseudo noise data generator may generate the pseudo noise data by performing an operation on each color component of each pixel or predetermined unit of area in the noise-free portion of the image data, the operation being multiplication by the corresponding background visibility rate T and thereafter addition of the corresponding density component value D.

In the original reading device, the plurality of background plates may include a white background plate and a black background plate, each influence value calculated by the calculator may be composed of a background visibility rate T indicating a degree to which a background image can be seen through the dirtiness source, and a density component value D indicating a value of a component of light that is not influenced by the background image, background visibility rate T={(data of the line noise portion of the correction data piece for the white background plate)−(data of the line noise portion of the correction data piece for the black background plate)}/{(average data for a portion of the correction data piece for the white background plate, the portion being in a vicinity of the line noise excluding the line noise portion)−(average data for a portion of the correction data piece for the black background plate, the portion being in a vicinity of the line noise excluding the line noise portion)}, density component value D={(data of the line noise portion of the correction data piece for the white background plate)−(average data of the portion of the correction data piece for the white background plate, the portion being in the vicinity of the line noise excluding the line noise portion)×background visibility rate T}, and the pseudo noise data generator may generate the pseudo noise data by performing an operation on each color component of each pixel in the noise-free portion of the image data, the operation being multiplication by the corresponding background visibility rate T and thereafter addition of the corresponding density component value D.

According to these structures, background visibility rates and density component values are calculated based on the correction data for the white background plate and the correction data for the black background plate.

For example, when reading an original by a sheet-through method, even if the three colors of sensors are simultaneously influenced by the same piece of debris, the debris does not necessary have the same level of influence on all three of the color sensors. If the debris has transmissivity, a color sensor away from the center of the debris may read image data that includes an image of the original as well as an image of the debris. Accordingly, a background visibility rate indicating how transmissive the debris is and a density component value indicating the density of the debris are calculated based on the correction data for the background plates, thus enabling precise correction of the line noise portion of data.

In the original reading device, the reader may generate the correction data pieces for the background plates as data pertaining to full-color color components, the calculator may calculate an influence value for each of the color components, and the corrector may include: a judging part operable to focus on pixels in the line noise portion of the image data one-by-one, and for each color component of the pixel being focused on, judge whether the level of influence indicated by the influence value is lower than a level of influence indicated by a predetermined specified value; and a replacing part operable to, if the judging part has judged that the level of influence indicated by the influence value for all color components of the pixel being focused on is lower than the level of influence indicated by the predetermined specified value, correct the line noise portion of the image data by performing an inverse operation on all color components of the pixel being focused on with use of the influence values of the pixel being focused on to eliminate the influence of the dirtiness source.

According to this structure, if the level of influence of all the color components is lower than the specified value, the line noise portion of data is corrected by directly performing an inverse operation on the line noise, thus highly precisely correcting low levels of influence from the dirtiness source.

In the original reading device, the reader may generate the correction data pieces for the background plates as data pertaining to full-color color components, the detector may detect a noise address for each of the color components, and the corrector may include: a judging part operable to focus on pixels in the line noise portion of the image data one-by-one, and judge whether each color component of the pixel being focused on requires correction, based on the noise addresses for the color components that were detected by the detector; a first corrector operable to, if the judging part has judged that only part of the color components of the pixel being focused on requires correction, (i) search pixels or predetermined units of area in a vicinity of the pixel being focused on to find a pixel or predetermined unit of area that approximates values of a part of the color components judged to not require correction, and (ii) replace all color components of the pixel being focused on with color components of the found pixel or predetermined unit of area; and a second corrector operable to, if the judging part has judged that all color components of the pixel being focused on require correction, (i) perform preliminary correction on pixels or predetermined units of area in a vicinity of the pixel being focused on with use of the influence value calculated by the calculator to generate preliminary correction data, (ii) search the preliminary correction data to find a pixel or predetermined unit of area that approximates a value of a color component of the pixel being focused on whose influence value indicates a level of influence that is lower than a level of influence indicated by a predetermined specified value, and (iii) replace all color components of the pixel being focused on with color components of the pixel or predetermined unit of area used in the generation of the found pixel or predetermined unit of area.

According to this structure, if any of the color components are inferred to not be influenced by debris and do not require correction, the value of the image data of the color component that does not require correction is used to search the vicinity of the pixel being focused on for data to be used to replace all color components of the pixel being focused on. If all of the color components require correction, preliminary correction is performed on the data in the vicinity of the pixel being focused on using the influence value to generate preliminary correction data. Based on the value of image data pertaining to a color component in the preliminary correction data whose level of influence is lower than the specified value, the preliminarily corrected data is searched to find data to be used to replace all color components of the pixel being focused on. Compared with conventional technology, this structure enables correcting the line noise portion data more precisely in response to various situations.

Another aspect of the present invention is an original reading device that moves an original by a sheet-through method and generates image data corresponding to an image of the original, including: a plurality of background plates having mutually different densities; a background plate switcher operable to automatically switch between the plurality of background plates one-by-one and in order, so as to be a background at a reading position in the sheet-through method; a reader operable to (i) generate a correction data piece for each of the background plates by, when the original is located away from the reading position, performing an image reading operation each time the switcher switches between the background plates, and (ii) generate the image data by reading the image of the original by the sheet-through method when the original has reached the reading position; a calculator operable to calculate a background visibility rate and a density component value based on the correction data pieces for the background plates, the background visibility rate indicating a degree to which a background image can be seen through a dirtiness source inferred to exist at an area of the reading position, and the density component value pertaining to the dirtiness source and indicating a value of a component of light is not influenced by the background image; a detector operable to, based on at least one of the background visibility rate and the density component value, detect a noise address indicating a generation position where line noise is generated continuously in a moving direction of the original due to the dirtiness source on an original platen during original reading; and a corrector operable to correct a line noise portion of the image data with use of the background visibility rate and the density component value, the line noise portion being indicated by the detected noise address.

Another aspect of the present invention is a computer-readable recording medium having recorded thereon an original reading program for causing original reading processing to be performed by an original reading device that moves an original by a sheet-through method and generates image data corresponding to an image of the original, the original reading device including: a plurality of background plates having mutually different densities; and a background plate switcher operable to automatically switch between the plurality of background plates one-by-one and in order, so as to be a background at a reading position in the sheet-through method, and the original reading program causing the original reading device to perform the steps of: (i) generating a correction data piece for each of the background plates by, when the original is located away from the reading position, performing an image reading operation each time the switcher switches between the background plates, and (ii) generating the image data by reading the image of the original by the sheet-through method when the original has reached the reading position; calculating a background visibility rate and a density component value based on the correction data pieces for the background plates, the background visibility rate indicating a degree to which a background image can be seen through a dirtiness source inferred to exist at an area of the reading position, and the density component value pertaining to the dirtiness source and indicating a value of a component of light that is not influenced by the background image; detecting, based on at least one of the background visibility rate and the density component value, a noise address indicating a generation position where line noise is generated continuously in a moving direction of the original due to the dirtiness source on an original platen during original reading; and correcting a line noise portion of the image data with use of the background visibility rate and the density component value, the line noise portion being indicated by the detected noise address.

Another aspect of the present invention is an original reading method used in an original reading device that moves an original by a sheet-through method and generates image data corresponding to an image of the original, the original reading device including: a plurality of background plates having mutually different densities; and a background plate switcher operable to automatically switch between the plurality of background plates one-by-one and in order, so as to be a background at a reading position in the sheet-through method, and the original reading method including the steps of: (i) generating a correction data piece for each of the background plates by, when the original is located away from the reading position, performing an image reading operation each time the switcher switches between the background plates, and (ii) generating the image data by reading the image of the original by the sheet-through method when the original has reached the reading position; calculating a background visibility rate and a density component value based on the correction data pieces for the background plates, the background visibility rate indicating a degree to which a background image can be seen through a dirtiness source inferred to exist at an area of the reading position, and the density component value pertaining to the dirtiness source and indicating a value of a component of light that is not influenced by the background image; detecting, based on at least one of the background visibility rate and the density component value, a noise address indicating a generation position where line noise is generated continuously in a moving direction of the original due to the dirtiness source on an original platen during original reading; and correcting a line noise portion of the image data with use of the background visibility rate and the density component value, the line noise portion being indicated by the detected noise address.

The above device, program, and method enable calculating background visibility rates and density component values based on the correction data for the background plates, and the background visibility rates and density component values are used to correct line noise. This obtains the superior effect of being able to perform line noise correction even if line noise appears due to debris etc. that simultaneously influences all colors of sensors.

Also, a noise address is detected based on either of or both the background visibility rates and the density component values, thus performing detection from a different viewpoint than conventional technology and detecting noise addresses more precisely than in conventional technology. Accordingly, noise addresses can be detected even if the debris etc. has a relatively low density, and complex density gradations can be detected.

BRIEF DESCRIPTION OF THE DRAWINGS

These and other objects, advantages, and features of the invention will become apparent from the following description thereof taken in conjunction with the accompanying drawings, which illustrate a specific embodiment of the present invention.

In the drawings.

DESCRIPTION OF THE PREFERRED EMBODIMENT

Embodiment

Overview

The present embodiment of the present invention is an image formation device including an original reading device that reads an image of an original by a sheet-through method. Before the original is scanned, the image formation device detects a line noise address by performing a preliminary debris detection operation in which images are read against a plurality of background plates having mutually different densities, before the original reaches the reading position. The image formation device then calculates an influence value that indicates a level of influence of a dirtiness source that causes the line noise to appear (i.e., calculates a transmissivity rate indicating how visible a background is through debris etc., and a density component value indicating the density the debris etc. based on of a component of light that has reflected off of the debris etc.). The image formation device then corrects line noise that appears in the image data of the scanned original based on the detected line noise address and calculated influence value.

Structure

Figure 1:
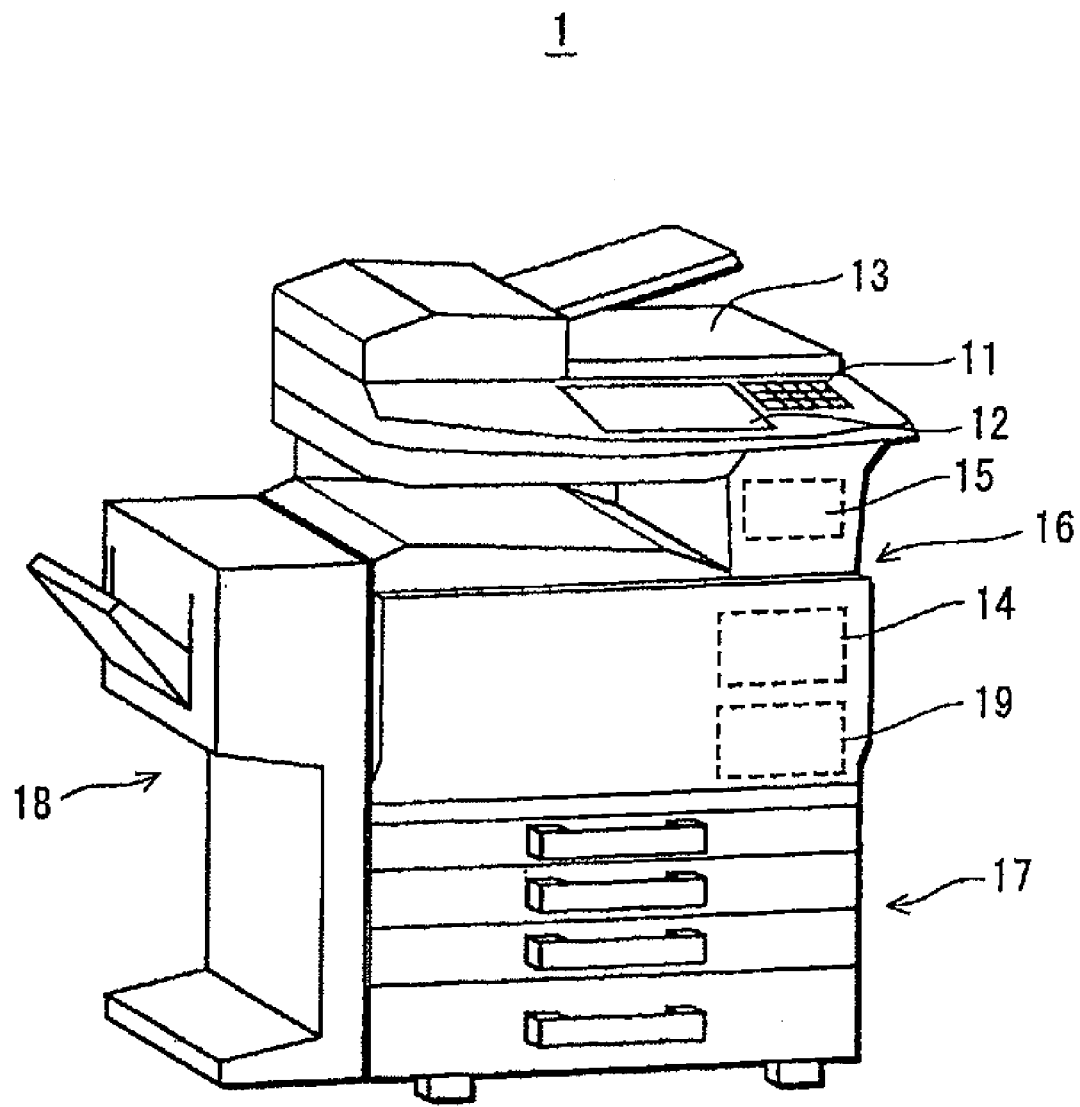
FIG. 1 shows an external appearance of an image formation device 1 in an embodiment.

FIG. 1 shows an external appearance of an image formation device 1 of the present embodiment.

The image formation device 1 of the present embodiment is a multi-function device that includes a plurality of functions such as a copying function, a network printing function, a scanning function, a faxing function, and a document server function. As shown in FIG. 1, the image formation device 1 includes an operation part 11, a display 12, a scanner 13, a communication part 14, a data storage part 15, a printer 16, a sheet feeder 17, a finisher 18, and a calculation controller 19.

The operation part 11 is an operation panel that includes a plurality of input buttons. The operation part 11 is disposed in the front on the top face of the device so as to be easily operable by a user. The operation part 11 receives a user input of operations, instructions, numbers, characters, etc., and notifies the user input to the calculation controller 19.

The display 12 is a display device such as a liquid crystal display, and is disposed adjacent to the operation part 11. Under control of the calculation controller 19, the display 12 provides the user with various types of visual information. For example, the display 12 displays information indicating the state of the device, error information, an image based on stored image data, a transmission destination list, information input by the user, and touch panel keys.

In the present embodiment, the operation part 11 and display 12 constitute a touch panel. The display 12 displays touch panel softkeys on a display, and the operation part 11 recognizes when the user has touched locations on the display 12 that correspond to the softkeys and notifies such information to the calculation controller 19.

The scanner 13 is a hardware portion of the original reading device that reads an image of an original by a sheet-through method. The scanner 13 is disposed on the upper part of the image formation device 1. The scanner 13 generates image signals by using photoelectric conversion to read image information such as photographs, illustrations and characters from an original, and converts the generated image signals to digital data. The calculation controller 19 performs various types of existing image processing and image processing unique to the present embodiment on the resulting digital data, thus generating image data in which line noise has been corrected. The generated image data is sent to the communication part 14, data storage part 15, printer 16, etc., and used, stored, and transmitted by such parts. Note that details of the scanner 13 are described in a later section.

The communication part 14 is a communication interface that performs the transmission/reception of image data, instruction commands, etc. with an external device, and is connected to an NIC (Network Interface Card), a modem, a TA (Terminal Adapter), and the like. The communication part 14 is disposed inside the image formation device 1. The communication part 14 receives image data to be stored or printed from, for example, an external personal computer (not depicted) or fax machine (not depicted), and sends such image data to the data storage part 15 or printer 16. The communication part 14 also transmits image data generated by the calculation controller 19 from image information read by the scanner 13, and image data stored by the data storage part 15, to the external personal computer or fax machine.

The data storage part 15 is a storage medium composed of a hard disk, a memory card reader/writer, a memory card, and the like, and is disposed inside the image formation device 1. The data storage part 14 stores, for example, image data generated by the calculation controller 19 from image information read by the scanner 13, and image data received by the communication part 14. Here, since the memory card writer can be easily removed from the memory card writer, data can be exchanged with an external device independent of the communication part 14, and the memory card can be used for data backup.

The printer 16 is disposed in the central portion of the image formation device 1 and forms color images on a recording sheet such as paper or OHP film, based on image data generated by the calculation controller 19 from image information read by the scanner 13, image data received from an external device by the communication part 14, or image data stored by the data storage part 15.

The sheet feeder 17 is provided below the printer 16. The sheet feeder 17 stores various types of recording sheets, retrieves desired sheets one-by-one, and supplies them to the printer 16.

The finisher 18 is provided in the vicinity of an end point of a recording sheet conveyance path in the printer 16. The finisher 18 performs post-processing such as stapling and hole-punching on recording sheets having color images formed thereon.

The calculation controller 19 is composed of a microcontroller, control program, and the like, and is disposed inside the image formation device 1. The calculation controller 19 controls overall operations of the image formation device 1 and performs various calculation processing such as various types of existing image processing and the image processing unique to the present embodiment.

Figure 2:
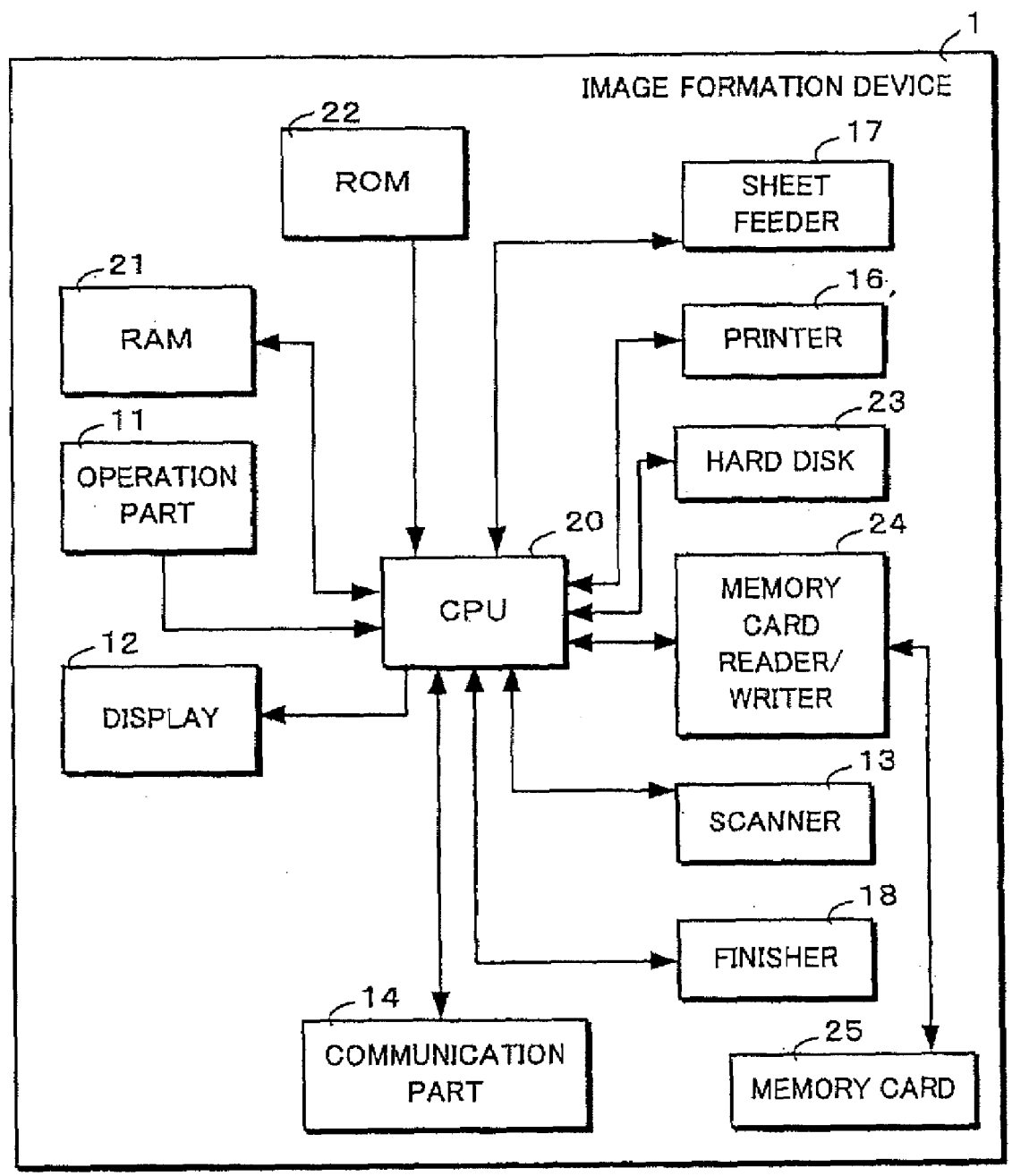
FIG. 2 shows a physical structure of the image formation device 1 in the embodiment.

FIG. 2 shows a physical structure of the image formation device 1 of the present embodiment.

As shown in FIG. 2, the image formation device 1 includes the operation part 11, the display 12, the scanner 13, the communication part 14, the printer 16, the sheet feeder 17, the finisher 18, a CPU 20, a RAM 21, a ROM 22, a hard disk 23, a memory card reader/writer 24, and a memory card 25. The operation part 11, display 12, scanner 13, communication part 14, printer 16, sheet feeder 17, and finisher 18 shown in FIG. 2 correspond to the parts having the same numbers in FIG. 1. The CPU 20, RAM 21, and ROM 22 shown in FIG. 2 correspond to the calculation controller 19 in FIG. 1, and the hard disk 23, memory card reader/writer 24, and memory card 25 shown in FIG. 2 correspond to the data storage part 15 in FIG. 1.

The CPU 20 directly executes a dedicated calculation control program stored in the ROM 22, or temporarily loads the calculation control program to the RAM 21 and then executes it.

The RAM 21 is a work area for the CPU 20.

The ROM 22 stores the dedicated calculation control program.

Figure 3:
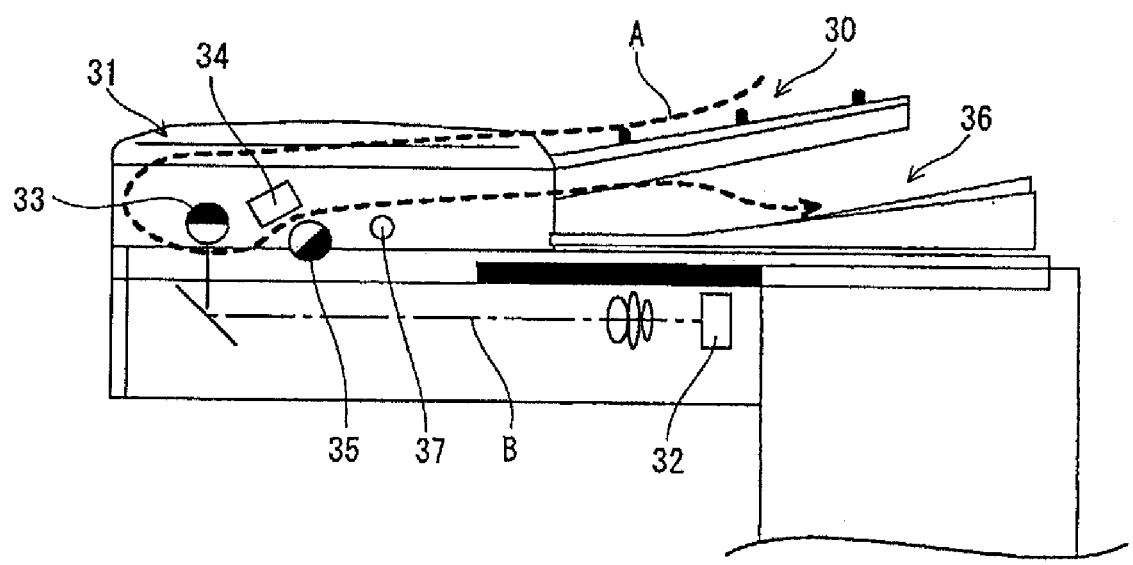
FIG. 3 shows an outline of a detailed structure of a scanner 13 in the embodiment.

FIG. 3 shows an outline of a detailed structure of the scanner 13 of the present embodiment. In FIG. 3, a thick dashed line A indicates an original conveyance path, and a thin dashed-dotted line B indicates an optical path used when reading the front side of an original.

As shown in FIG. 3, the scanner 13 includes an original tray 30, a document feeder 31, a front side image pickup sensor 32, a front side background plate set 33, a backside image pickup sensor 34, a back side background plate set 35, an original discharge tray 36, and a background plate switching motor 37. The following operations are performed in the preliminary debris detection operation. The background plate switching motor 37 causes the front side background plate set 33 and back side background plate set 35 to operate in conjunction. The background plate switching motor 37 automatically switches the background plates so that they are disposed one-by-one and in order as a background at a reading position in a sheet-through method. Each time the plurality of background plates are switched one-by-one and in order, the front side image pickup sensor 32 and, when necessary, the back side image pickup sensor 34 read an image against the backgrounds before the original has reached the reading position, and correction data is generated for each of the background plates. In an original scanning operation, an original placed in the original tray 30 is retrieved by the document feeder 31, the front side image pickup sensor 32 and, when necessary, the back side image pickup sensor 34 read an image of the original, and thereafter the original is discharged into the original discharge tray 36. Note that in addition to a sheet-through method, the scanner 13 is also compatible with a platen-set type of original reading method in which the original is fixed in place and the optical system is moved across the original. The front side image pickup sensor 32 is used when performing original reading by the sheet-through method and the platen-set method, and the back side image pickup sensor 34 is used only when performing two-side reading by the sheet-through method.

Details of the Scanner

Figure 4:
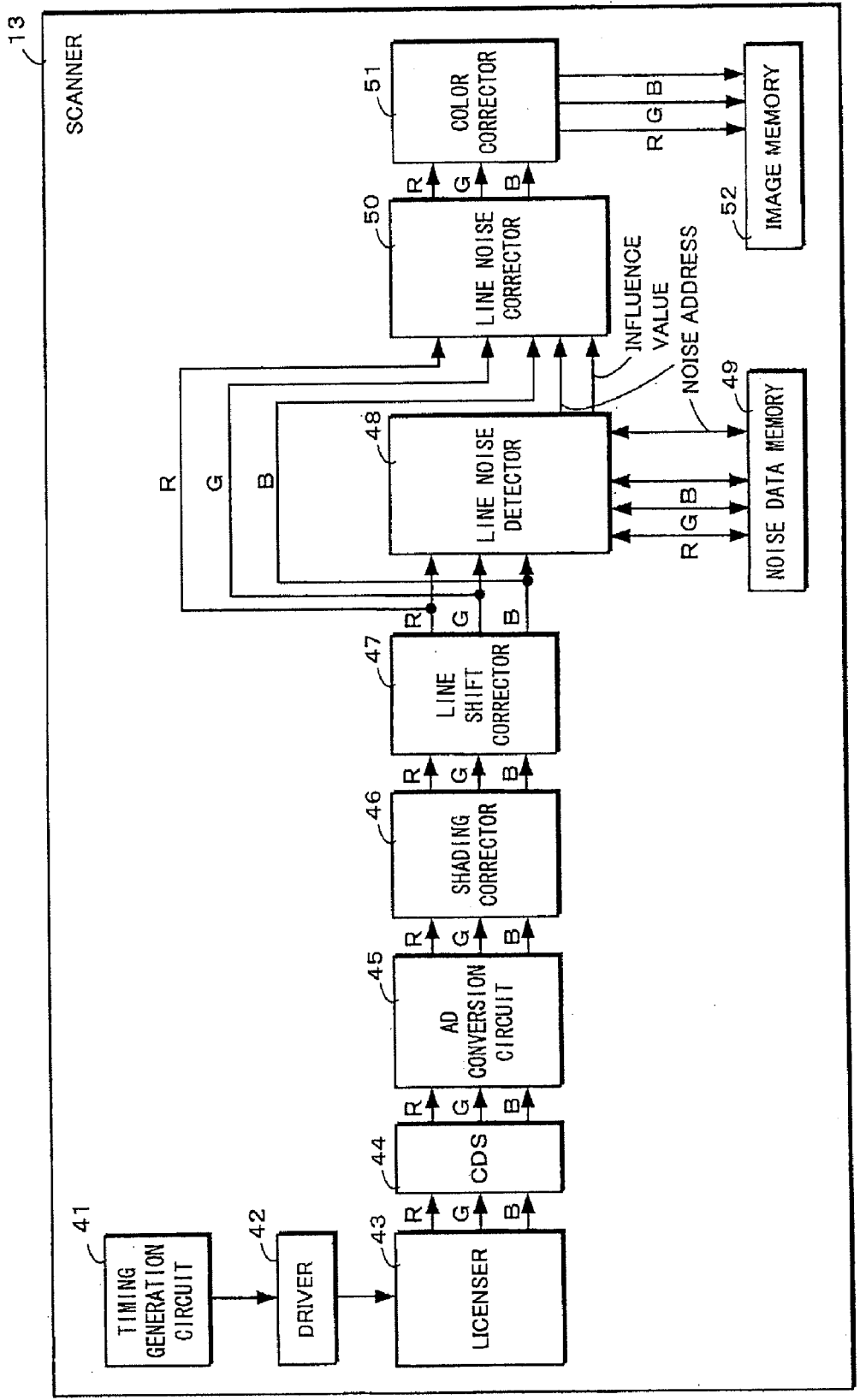
FIG. 4 shows an outline of a basic functional structure of the scanner 13 in the embodiment.

FIG. 4 shows an outline of a basic functional structure of the scanner 13 in the present embodiment.

(1) In the preliminary debris detection operation and the original scanning operation, a timing generation circuit 41 performs timing control and outputs a drive pulse to a line sensor 43 via a driver 42.

(2) The line sensor 43 is driven by the drive pulse and generates an image signal. The generated image signal is sampled by a CDS 44, then converted from analog to digital by an AD conversion circuit 45 and output as separate digital data for each of R, G, and B.

(3) A shading corrector 46 performs shading correction on the digital data output after AD conversion, and then a line shift corrector 47 corrects shift between RGB lines.

In this way, the timing generation circuit 41, driver 42, line sensor 43, CDS 44, AD conversion circuit 45, shading corrector 46, and line shift corrector 47 operate such that, in the preliminary debris detection operation, the plurality of background plates are disposed one-by-one so as to be a background at the reading position in the sheet-through method, and correction data is generated for each of the background plates by reading an image against the background plates before the original has reached the reading position. In the original scanning operation, the original is conveyed to the reading position, an image of the original is read by the sheet-through method, and image data is generated.

(4) In the preliminary debris detection operation, the data output after shift processing is separate correction data for each of the background plates. The line noise detector 48 detects a noise address by performing line noise detection processing with use of the separate correction data for R, G, and B, and the correction data for R, G, and B and the noise address are stored in a noise data memory 49. Thereafter, the line noise detector 48 calculates an influence value that indicates a level of influence of a dirtiness source that is inferred to exist at an area corresponding to the noise address. The noise address and influence value are then sent to a line noise corrector 50. The correction data generation processing, line noise detection processing, influence value calculation processing, etc. performed by the line noise detector 48 are described in detail in a later section.

(5) In the original scanning operation, the data output after shift processing is original image data. The line noise corrector 50 corrects line noise by performing line noise correction processing on the original image data with use of the noise address and influence value received from the line noise detector 48. The line noise correction processing performed by the line noise corrector 50 is described in detail in a later section.

(6) A color corrector 51 performs color correction (e.g., spectral correction, gradation correction, and aberration correction necessary due to the line sensors) on the original image data in which the line noise has been corrected by the line noise correction processing. The resulting data is then standardized and stored in an image memory 52.

Figure 5:
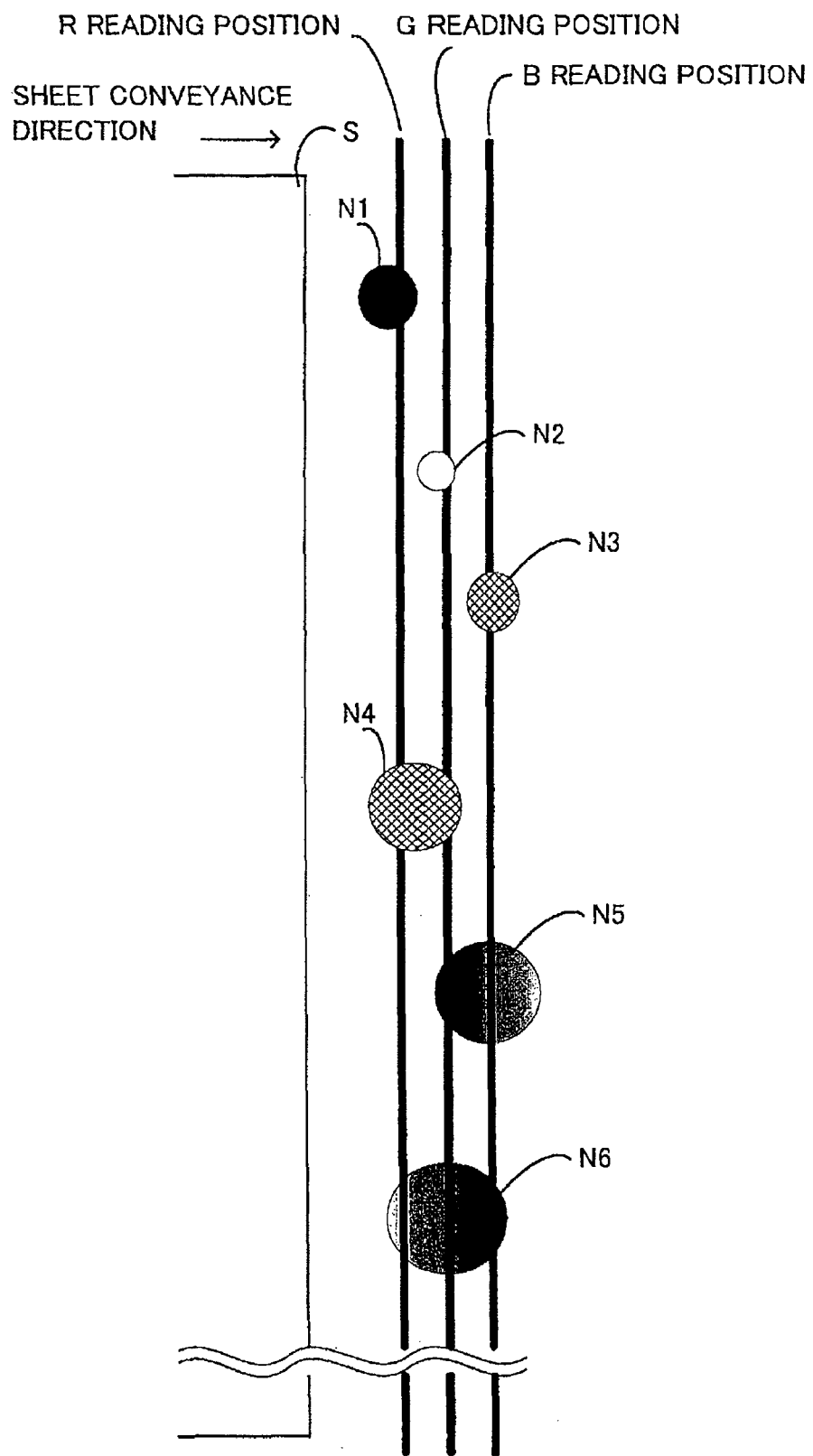
FIG. 5 shows a relationship between image reading positions and positions of dirtiness sources such as debris on an original platen.

FIG. 5 shows a relationship between image reading positions and positions of dirtiness sources such as debris on the original platen.

As shown in FIG. 5, the original reading positions for the colors red, green, and blue (shown in FIG. 5 as R, G, and B) are parallel lines substantially orthogonal to the original conveyance direction. The lines at the R, G, and B original reading positions are separated by, for example, roughly 4 pixels.

Here, FIG. 5 illustrates the six anticipated patterns of N1 to N6 as positions of debris etc. on the original platen.

In pattern N1, debris etc. is only obstructing the red line, and therefore line noise only appears in the red image data in this case. Also, if the debris etc. were black as in pattern N1, the debris etc. would easily detected if the original were white or close to white, but not easily detected if the original were black or close to black.

In pattern N2, debris etc. is only obstructing the green line, and therefore line noise only appears in the green image data in this case. Also, if the debris etc. were white as in pattern N2, the debris etc. would be easily detected if the original were black or close to black, but not easily detected if the original were white or close to white.

In pattern N3, debris etc. is only obstructing the blue line, and therefore line noise only appears in the blue image data in this case. Also, if the debris etc. were a halftone as in pattern N3, the debris etc. would be easily detected if the original were black, close to black, white, or close to white, but not easily detected if the original were also halftone.

In the present embodiment, debris etc. is detected in the preliminary debris detection operation with use of a white background plate and a black background plate, thus enabling debris etc. to be detected without difficulty regardless of whether the debris is black, white, a halftone, or any color.

In pattern N4, debris etc. is obstructing the red and green lines, and therefore line noise appears in the red image data and green image data in this case.

In pattern N5, debris etc. is obstructing the green and blue lines and therefore line noise appears in the green image data and blue image data.

In pattern N6, debris etc. is obstructing all of the lines, and therefore line noise appears in the red image data, green image data, and blue image data in this case.

In the present embodiment, the following processing is performed if the debris etc. has transmissivity as in patterns N5 and N6. An influence value indicating the level of influence of the dirtiness source such as debris is calculated based on a difference between reading values taken at the probable position of the debris etc. when using the white background plate and the black background plate. The influence value is obtained by calculating a background visibility rate indicating a degree to which a background image can be seen through the debris etc., and a density component value indicating a density value of the debris etc. based on a component of light that has reflected off of the surface of the debris and is not influenced by the background. This enables performing correction even in a case such as pattern N6 in which correction cannot be performed by a conventional method, and improves the precision of correction. Here, the level of influence of the dirtiness source decreases as the background visibility rate increases, and increases as the density component value increases.

Details of the Line Noise Detector

Figure 6:
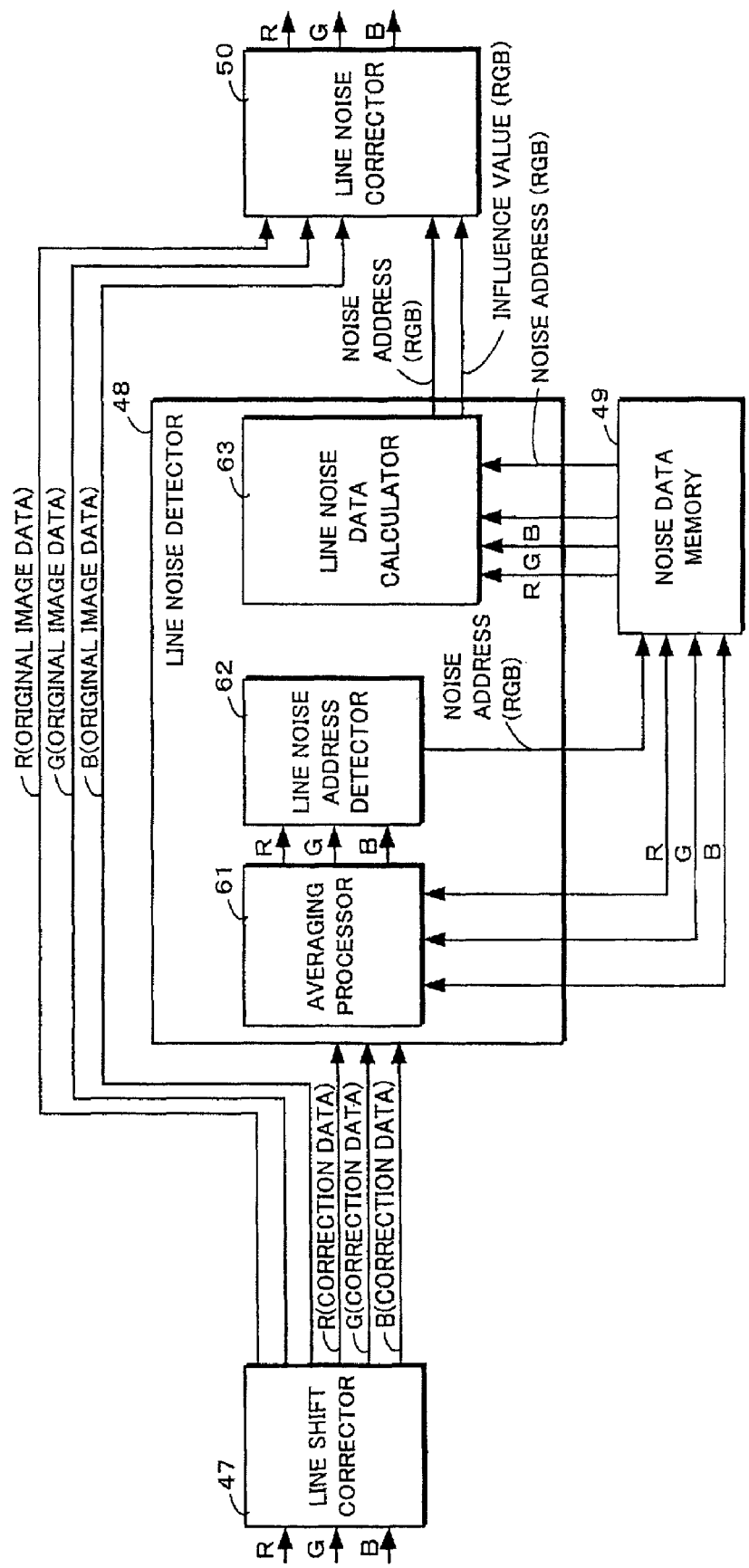
FIG. 6 is a functional block diagram showing an outline of a functional structure of a line noise detector 48.

FIG. 6 is a functional block diagram showing an outline of a functional structure of the line noise detector 48.

(1) In the preliminary debris detection operation, correction data for each of the background plates is output from the line shift corrector 47 and stored in the noise data memory 49. An averaging processor 61 averages the stored correction data separately for each of the background plates.

(2) The averaged correction data for each of the background plates is sent to the line noise address detector 62 and stored separately for each of the background plates in the noise data memory 49.

(3) For each of the red, green, and blue components of the separate correction data for each of the background plates, the line noise address detector 62 detects a line noise address indicating a position at which line noise is presumed to appear continuously in the moving direction of the original due to the dirtiness source such as debris on the original platen during original reading. The detected line noise address is stored in the noise data memory 49. Here, the line noise detection is performed by detecting whether the difference between the value of a pixel and the overall average is greater than or equal to a predetermined value.

In the present embodiment, correction data is first obtained five times by performing reading against the white background plate, and the correction data is averaged by the averaging processor 61 and stored in the noise data memory 49. The line noise address detector 62 then separately detects a line noise address for the red, green, and blue components and stores the detected noise addresses in the noise data memory 49. Next, the background is switched, correction data is obtained five times by performing reading against the black background plate, and the correction data is averaged by the averaging processor 61 and stored in the noise data memory 49. The line noise address detector 62 separately detects a line noise address for the red, green, and blue components and stores the detected noise address in the noise data memory 49. As a result of this processing, the noise data memory 49 stores a line noise address for the red component against the white background plate, a line noise address for the green component against the white background plate, a line noise address for the blue component against the white background plate, a line noise address for the red component against the black background plate, a line noise address for the green component against the black background plate, and a line noise address for the blue component against the black background plate.

In the present embodiment, the line noise addresses are detected based on the separate correction data for each of the background plates. However, the line noise addresses may be detected based on correction data for only one of the background plates, or may be detected based on the original image data as in conventional technology.

(4) Next, a line noise data calculator 63 calculates a background visibility rate and density component value for each of red, green, and blue.

Figure 7:
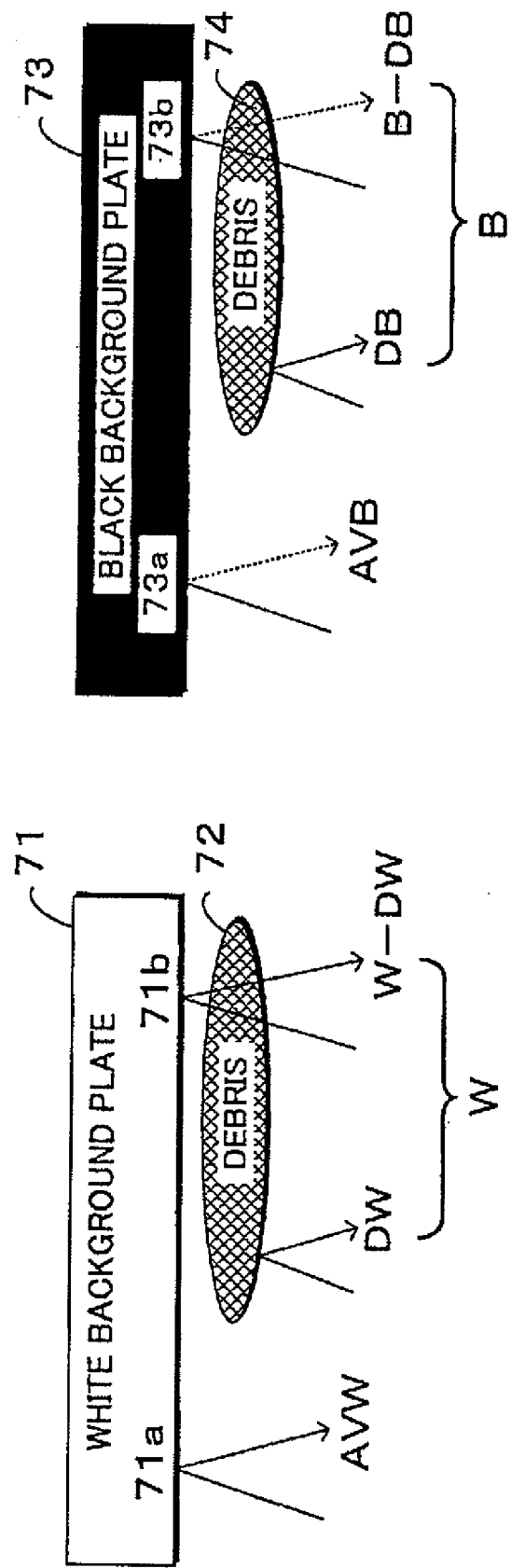
FIG. 7 shows a relationship between the influence of debris etc. and correction data for a white background plate and a black background plate.

FIG. 7 shows a relationship between the influence of debris etc. and correction data for the white background and the black background.

As shown in FIG. 7, in the correction data for the white background plate 71, almost all of the component of irradiated light reflects off of the white background plate at 71a where debris etc. is not present, and the image data in this case is substantially equal to an average value AVW in the correction data for the white background plate. At 71b where debris 72 is present, a total of a component of light that passes through the debris 72, reflects off of the white background plate, and passes back through the debris 72, as well as a component DW of light that has reflected off of the surface of the debris 72 is detected, and the image data in this case is substantially equal to correction data W for the white background pertaining to the line noise portion. Accordingly, the component of light that passed back through the debris 72 is expressed as W−DW.

In the correction data for the black background plate 73, very little of the component of irradiated light reflects off of the black background plate at 73a where debris etc. is not present, and the image data at this portion is substantially equal to an average value AVB in the correction data for the black background plate. At 73b where debris 74 is present, a total of a component of light that passes through the debris 74, reflects off of the black background plate, and passes back through the debris 74, as well as a component DB of light that has reflected off of the surface of the debris 74 is detected, and the image data at this portion is substantially equal to correction data B for the black background plate pertaining to the line noise portion. Accordingly, the component of light that passed back through the debris 74 is expressed as B−DB.

Here, since DW and DB are components that have not been influenced by the background image, the values are equal if the debris 72 and debris 74 are the same piece of debris. Therefore, if a density component value D is defined as the value of the component of light that mainly reflected off of the surface color of the dirtiness source such as debris etc. and was not influenced by the background image, and DW and DB are replaced by the density component value D, the component that passed back through the debris 72 is (W−D), and the component that passed back through the debris 74 is (B−D). Here, the background visibility rate T that indicates the degree to which the background image can be seen through the dirtiness source is expressed by the following expression 1.

$$T=\{(W-D)-(B-D)\}/(AVW-AVB)$$

$$=(W-B)/(AVW-AVB) \quad \text{Expression 1}$$

Also, the density component value D can be expressed by the following expression 2 that uses T.

$$D=(W-AVW \times T) \quad \text{Expression 2}$$

(5) The calculated background visibility rates T and density component values D for each of red, green, and blue are sent along with the corresponding addresses to the line noise corrector 50 shown in FIG. 4.

Line Noise Detection Processing

Figure 8:
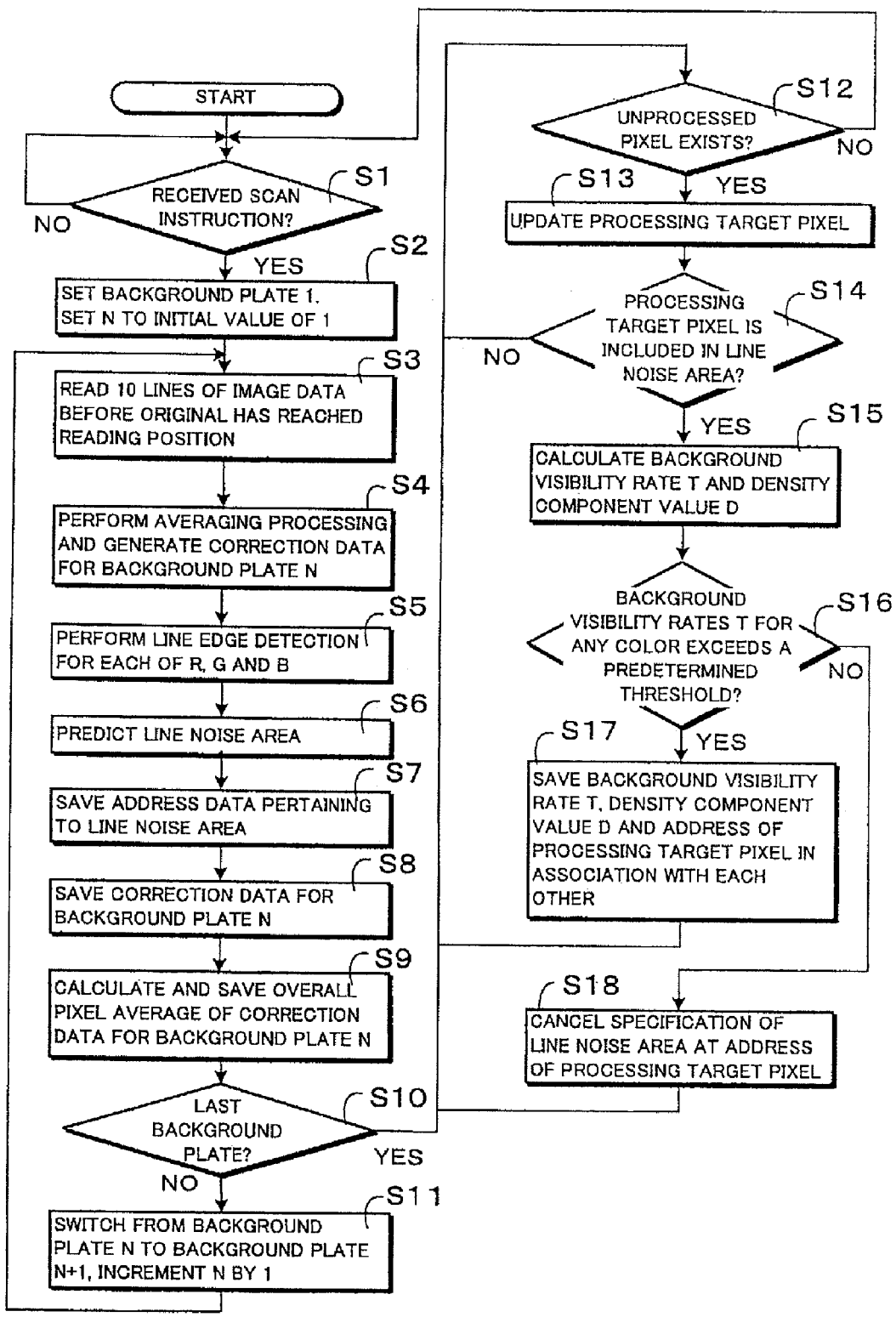
FIG. 8 shows an outline of a preliminary debris detection operation, and steps in correction data generation processing, line noise detection processing, background visibility rate T calculation processing, density component value D calculation processing, etc., which are performed by the line noise detector 48.

FIG. 8 shows an outline of the preliminary debris detection operation, and steps in correction data generation processing, line noise detection processing, background visibility rate T calculation processing, density component value D calculation processing, etc., which are performed by the line noise detector 48.

The following describes steps in the above processing performed by the line noise detector 48 etc. with reference to FIG. 8.

(1) A judgment is made as to whether a user etc. has instructed an original to be scanned (step S1).

(2) If an instruction to scan an original has been received, the background switching motor 37 shown in FIG. 3 is driven to rotate the front side background plate set 33 and back side background plate set 35 in one direction to set the background plate 1 that is to be used first, and sets a background plate serial number N to 1 (step S2).

(3) Ten lines worth of image data is read before the original reaches the reading position (step S3). Here, the background plates may be rotated little-by-little, and each case of reading may be performed at a different portion of the same color on the background plates.

(4) The ten lines worth of image data that has been read is averaged for each pixel to generate correction data for the background plate N (step S4). Here, the influence of outlying data may be reduced by discarding the two largest and two smallest data pieces for each pixel, and calculating an average for the remaining six pixels.

(5) Line edge detection is performed for each of red, green, and blue based on the correction data for the background plate N (step S5).

For example, a line edge is detected when a portion of the correction data for the white background plate or black background plate has a difference of 5% or more from the average.

Note that in the line edge detection, although detecting a line edge when a portion of any of the correction data for the background plates has a certain difference from the average is desirable due to being able to detect debris of any color, there are cases in which it is possible to obtain an equivalent detection precision even when line edge detection is performed based on correction data for only an arbitrary one of the background plates. Therefore, line edge detection may be performed based on only either the correction data for the white background plate or the correction data for the black background plate. Also, after image data of an original has been retrieved, line noise that is continuously generated in the moving direction of the original may be detected for each of red, green, and blue based on the image data, as in conventional technology.

(6) Based on a detected line edge, a line noise area is inferred for each of the red, green, and blue components (step S6). A line noise area is an area in which line noise is inferred to be continuously generated in the moving direction of the original due to the existence of a dirtiness source such as debris on the original platen when the original is being read. Note that in order to avoid the existence of uncorrected portions, the line noise area may be determined broadly by expanding the width of the area discerned based on the line edge by one to three pixels on each side.

(7) Address data pertaining to the inferred line noise area is stored (step S7).

(8) The correction data for the background plate N is stored (step S8).

(9) An overall pixel average is calculated based on the correction data for the background plate N and stored (step S9).

(10) A judgment is made as to whether the background plate is last or not (step S10).

(11) If the background plate is not last, the background plate switching motor 37 shown in FIG. 3 is driven to rotate the front side background plate set 33 and back side background plate set 35 in one direction to switch from background plate N to a background plate N+1, the background plate serial number N is incremented by 1, and processing similar to the processing that was performed with respect to the background plate N is performed again for the background plate N+1 (step S11).

(12) If the background plate is last, whether or not unprocessed pixels that have not been specified as processing target pixels is judged (step S12). If unprocessed pixels are judged to not exist, processing ends, and the image formation device waits for a scan instruction from the user etc.

(13) If unprocessed pixels are judged to exist, the processing target pixel is updated by specifying one of the unprocessed pixels as a new processing target pixel (step S13).

(14) A judgment is made as to whether the processing target pixel is included in at least one of the line noise areas corresponding to the background plates (step S14).

(15) If the processing target pixel is included in a line noise area corresponding to one of the background plates, the background visibility rate T and density component value D are calculated based on, for example, expression 1 or 2 (step S15).

(16) A judgment is made as to whether any of the background visibility rates T for the colors exceeds a predetermined threshold value (step S16).

(17) If one or more of the background visibility rates exceeds the predetermined threshold value, the calculated background visibility rate T and density component value D are stored in correspondence with the address of the processing target pixel, and processing is performed again for the next pixel (step S17).

(18) If none of the background visibility rates exceeds the predetermined threshold, the line noise area at the address of the processing target pixel is no longer specified, and processing is repeated for the next pixel (step S18).

Note that although an exemplary case of using two types of background plates, namely the white background plate and black background plate, is described in the present embodiment, halftone background plates, background plates for various colors, etc. may also be used to increase precision or calculate background visibility rates etc. for various colors.

Details of the Line Noise Corrector

Figure 9:
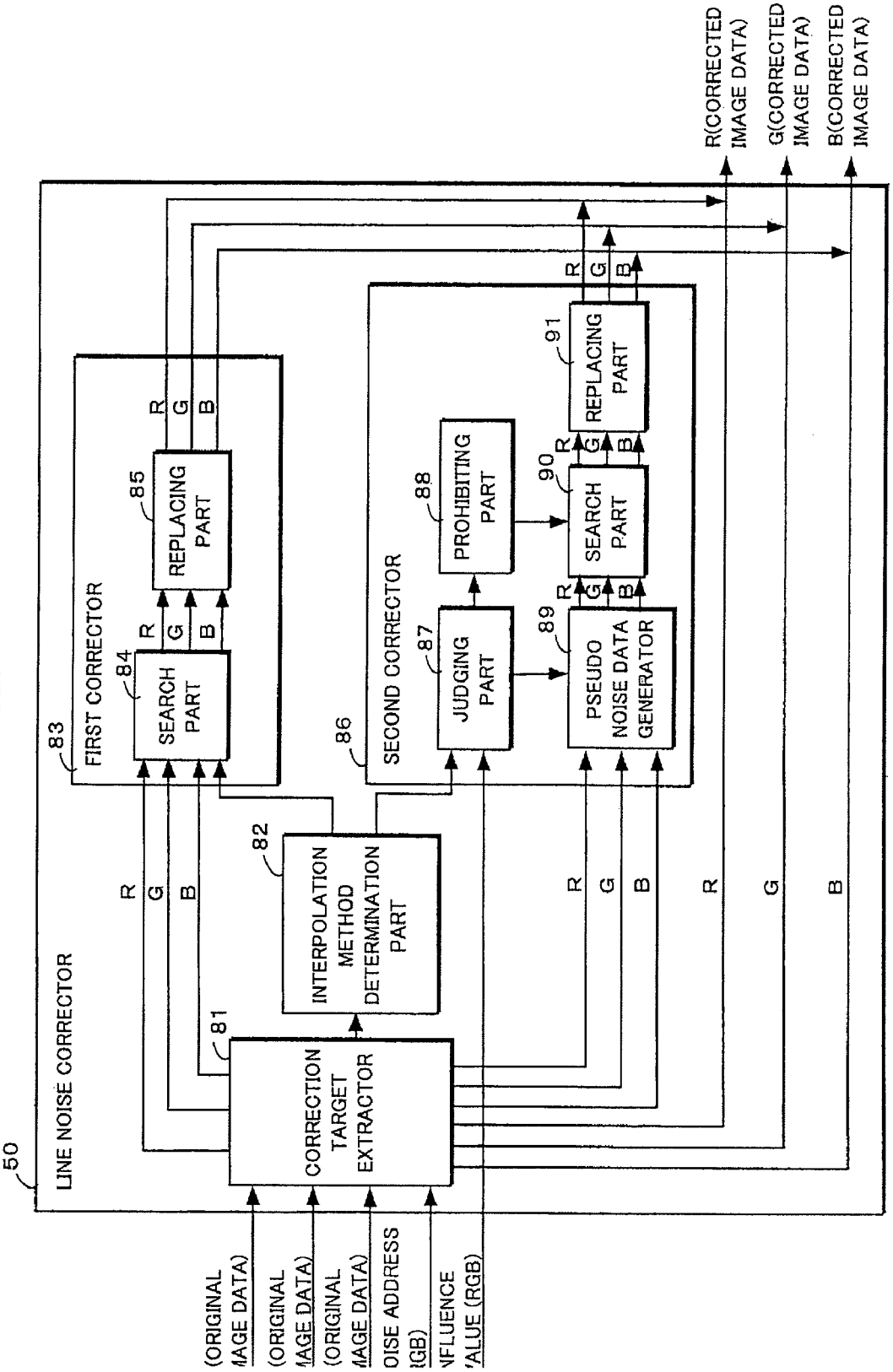
FIG. 9 is a functional block diagram showing an outline of a functional structure of a line noise corrector 50.

FIG. 9 is a functional block diagram shown an outline of a functional structure of the line noise corrector 50.

In the present embodiment, line noise correction is performed as follows. The line noise detector 48 focuses on noise pixels one at a time based on the stored address data pertaining to the line noise area, then searches for appropriate RGB data in data pertaining to surrounding pixels, and replaces the noise pixel being focused on with the found data. Line noise is corrected by performing the above processing on all of the noise pixels. There are two main types of correction methods, namely a method of judging whether or not data for a color that does not include noise exists, and a method in which correction is performed based on the magnitude of the background visibility rates calculated by the line noise detector 48. Details of the two methods are described below.

(1) A correction target extractor 81 receives the line noise area address data from the line noise detector 48 shown in FIG. 4. Based on the received address data, the correction target extractor 81 focuses on the pixels one at a time and determines addresses of correction processing target pixels. The correction target extractor 81 then extracts data pertaining to the correction processing target pixels from the image data of the original that has been received from the line shift corrector 47 shown in FIG. 4. The correction target extractor 81 then sends, to a search part 84 in a first corrector 83 and a pseudo noise data generator 89 in a second corrector 86, data of pixels that surround the correction processing target pixel and are outside the line noise area. The correction target extractor 81 also sends, to the color corrector 51 shown in FIG. 5, data for all the colors of pixels not included in the line noise area, without performing any processing thereon.

(2) An interpolation method determination part 82 determines a correction method to be performed on correction processing target pixels.

Specifically, in a first case where debris etc. is only blocking one of the red, green, and blue lines, as in patterns N1 to N3 shown in FIG. 5, the correction processing target pixels should only included in the line noise area of data pertaining to one color. In a second case where debris etc. is blocking two of the red, green, and blue lines, as in patterns N4 and N5 shown in FIG. 5, the correction processing target pixels should be included in the line noise area of data pertaining to two colors. In a third case where debris etc. is blocking all of the red, green, and blue lines, as in pattern N6 shown in FIG. 5, the correction processing target pixels should be included in the line noise area of the data pertaining to all of the colors. The interpolation method determination part 82 judges whether correction is necessary for each of the color components in the correction processing target pixels, and judges that the first case applies if the correction processing target pixels include data of two color components that are not included in the line noise area, and that the second case applies if the correction processing target pixels include data of only one component that is not included in the line noise area. In the first and second cases, the interpolation method determination part 82 determines correction 1 to be performed. In a third case where the correction processing target pixels do not include any data pertaining to a color not included in the line noise area, the interpolation method determination part 82 determines correction 2 to be performed.

(3) If the interpolation method determination part 82 judges that correction of a portion of color components of a full-color image is necessary, and determines to use correction 1 as the correction method, the first corrector 83 performs correction 1 on the correction processing target pixels.

The first corrector 83 includes the search part 84 and a replacing part 85.

The search part 84 searches, among pixels or predetermined units of area surrounding the correction processing target pixels that were sent from the correction target extractor 81 and are being focused on, for a pixel or predetermined unit of area that approximates the value of a color component judged to not require correction.

The replacing part 85 performs correction 1 on the correction processing target pixel by replacing all the color components of the correction processing target pixel being focused on with color components of data corresponding to the pixel or predetermined unit of area found by the search part 84, and sends the resulting data to the color corrector 51 shown in FIG. 4. Details of correction 1 are found in the description of steps in the line noise correction processing further below.

(4) If the interpolation method determination part 82 judges that correction of all color components of a full-color image is necessary, and determines to use correction 2 as the correction method, the first corrector 83 performs correction 2 on the correction processing target pixel.

The second corrector 86 includes a judgment part 87, a prohibiting part 88, the pseudo noise data generator 89, a search part 90, and a replacing part 91.

The judgment part 87 focuses on pixels in the line noise portion data one by one, and for each color component, judges whether a level of influence indicated by the background visibility rate T is lower than a level of influence indicated by a predetermined specification value. For example, the judgment part 87 judges the level of influence to be high if the background visibility rate T is less than 30%, and judges the level of influence to be low if the background visibility rate T is 30% or greater.

The prohibiting part 88 prohibits correction if the judgment part 87 judges that level of influence is not low for any of the color components.

For each color component of the image data of the pixels or predetermined unit of area that are outside the line noise portion and surround the pixel received from the correction target extractor 81 and being focused on, the pseudo noise data generator 89 performs an operation using the background visibility rates T and density component values D calculated by the line noise data calculator 63 shown in FIG. 6, thus generating pseudo noise data for simulating a state in which a dirtiness source is present at the surrounding pixels or predetermined unit of area.

If the judgment part 87 has judged that the level of influence indicated by the background visibility rate T of one or more color components is low, the search part 90 searches, among the pseudo noise data generated by the pseudo noise data generator 89, for a pixel or predetermined unit of area that matches or approximates the values of image data in each color component whose level of influence is low in the correction processing target pixel being focused on. If correction is being prohibited by the prohibiting part 88, the search part 90 sends the data of the pixel being focused on to the color corrector 51 shown in FIG. 4 via the replacing part 91 without performing a search or correcting the pixel data.

The replacing part 91 performs correction 2 on the correction processing target pixel by replacing all the color components of the correction processing target pixel being focused on with the color components of data corresponding to the pixel or predetermined unit of area found by the search part 90, and sends the resulting data to the color corrector 51 shown in FIG. 4.

Note that if the judgment part 87 has judged that the level of influence indicated by the background visibility rates T of all of the color components is low, the data of the correction processing target pixel may be corrected by directly performing an inverse operation thereon.

The following describes details of line noise processing according to correction 2.

Steps in the Line Noise Correction Processing

Figure 10:
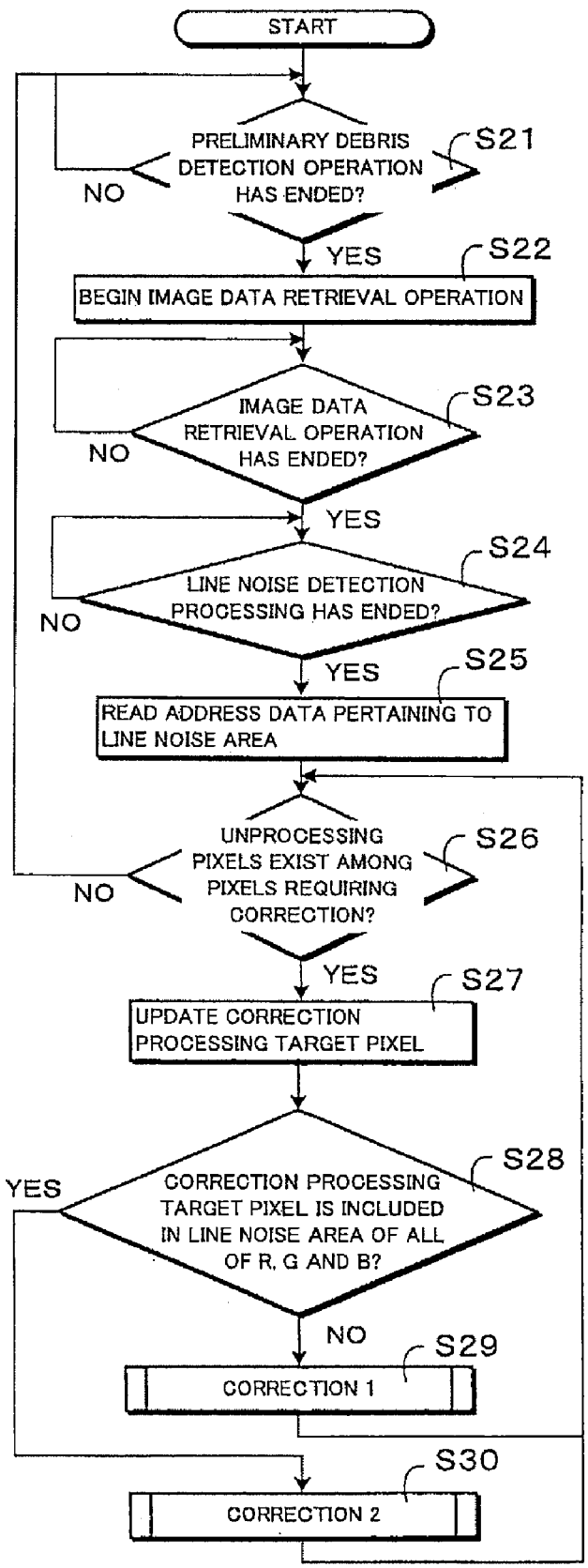
FIG. 10 shows an outline of steps in an original scanning operation, and line noise correction processing etc. performed by the line noise corrector 50.

FIG. 10 shows an outline of the original scanning operation and steps in the line noise correction processing etc. performed by the lie noise corrector 50.

The following describes steps in the processing performed by the line noise corrector 50 etc. with reference to FIG. 10.

(1) A judgment is made as to whether the preliminary debris detection operation has ended (step S21).

(2) When the preliminary debris detection operation has ended, an image data retrieval operation is begun (step S22).

(3) A judgment is made as to whether the image data retrieval operation has ended (step S23).

(4) When the image data retrieval operation has ended, a judgment is made as to whether the line noise detection processing has ended (step S24).

(5) When the line noise detection processing has ended, the line noise area address data is read (step S25).

(6) A judgment is made as to whether unprocessed pixels that have not been specified as the correction processing target pixel are included in the pixels that are specified by the read line noise area address data and require correction (step S26). If unprocessed pixels do not exist, processing ends and a judgment is made as to whether the preliminary debris detection operation has ended.

(7) If unprocessed pixels exist, the correction processing target pixel is updated by specifying one of the unprocessed pixels as a new correction processing target pixel (step S27).

(8) A judgment is made as to whether the correction processing target pixel is in the line noise area of all of the red, green, and blue data (step S28).

(9) If the correction processing target pixel is not in one or more of the line noise areas of the red, green, and blue areas, correction 1 is performed on the correction processing target pixel, and processing is repeated for the next pixel (step S29).

(10) If the correction processing target pixel is in all of the line noise areas of the red, green, and blue areas, correction 2 is performed on the correction processing target pixel, and processing is repeated for the next pixel (step S30).

Figure 11:
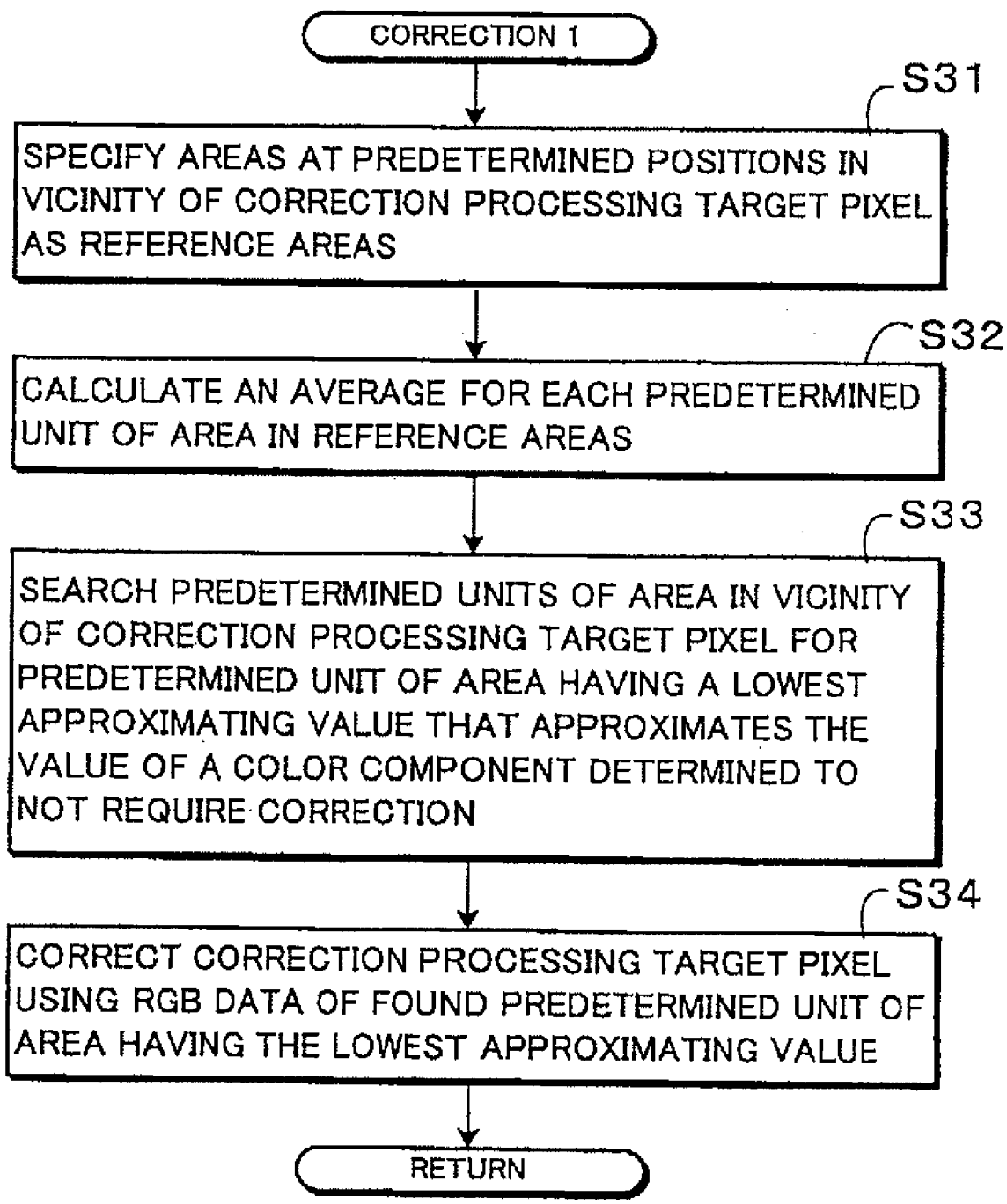
FIG. 11 shows an outline of correction 1 processing.

FIG. 11 shows an outline of correction 1 processing.

The following describes correction 1 processing with reference to FIG. 11.

(1) Areas at predetermined positions in the vicinity of a correction processing target pixel are specified as reference areas (step S31).

Figure 12:
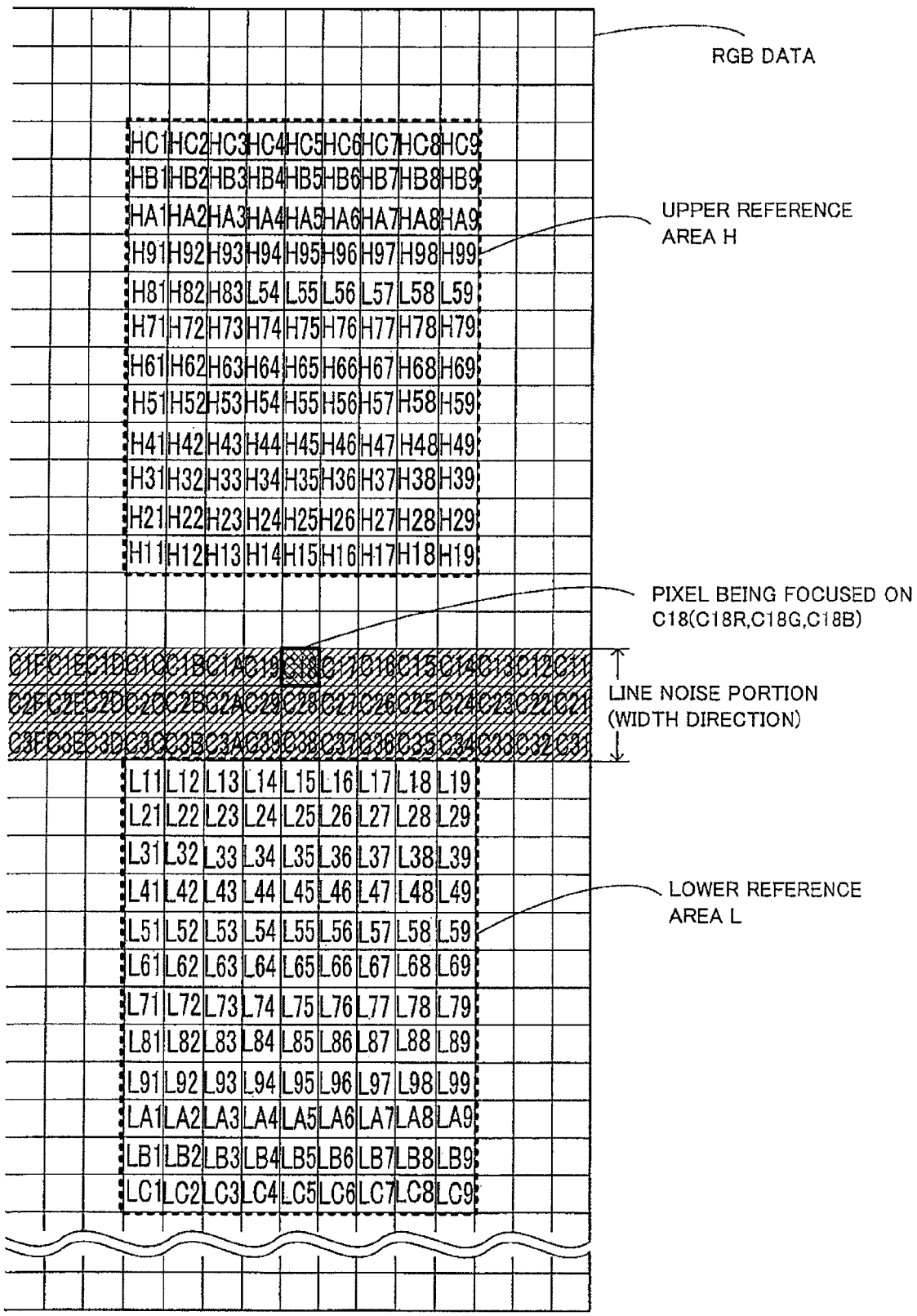
FIG. 12 shows examples of specified reference areas in the embodiment.

FIG. 12 shows examples of specified reference areas in the present embodiment.

In FIG. 12, the line noise portion is composed of pixels C11, C12, C13 ..., C21, C22, C23 ..., and C31, C32, C33 ..., and C18 is the pixel specified as the correction processing target pixel. Using the correction processing target pixel C18 as a reference, an upper reference area H and a lower reference area L are specified. In FIG. 12, the upper reference area H is composed of a range of pixels from +3 to +14 pixels in the vertical direction ("+" indicates an upward direction and "−" indicates a downward direction), and from −4 to +4 pixels in the horizontal direction ("+" indicates a leftward direction and "−" indicates a rightward direction). Therefore, the upper reference area H is composed of pixels H11 to H19, H21 to H29, H31 to H39, H41 to H49, H51 to H59, H61 to H69, H71 to H79, H81 to H89, H91 to H99, HA1 to HA9, HB1 to HB9, and HC1 to HC9. In FIG. 12, the lower reference area L is composed of a range of pixels from −3 to −14 pixels in the vertical direction, and from −4 to +4 pixels in the horizontal direction. Therefore, the lower reference area L is composed of pixels L11 to L19, L21 to L29, L31 to L39, L41 to L49, L51 to L59, L61 to L69, L71 to L79, L81 to L89, L91 to L99, LA1 to LA9, LB1 to LB9, and LC1 to LC9.

(2) In each reference area, an average is calculated for each predetermined unit of area (step S32).

Figure 13:
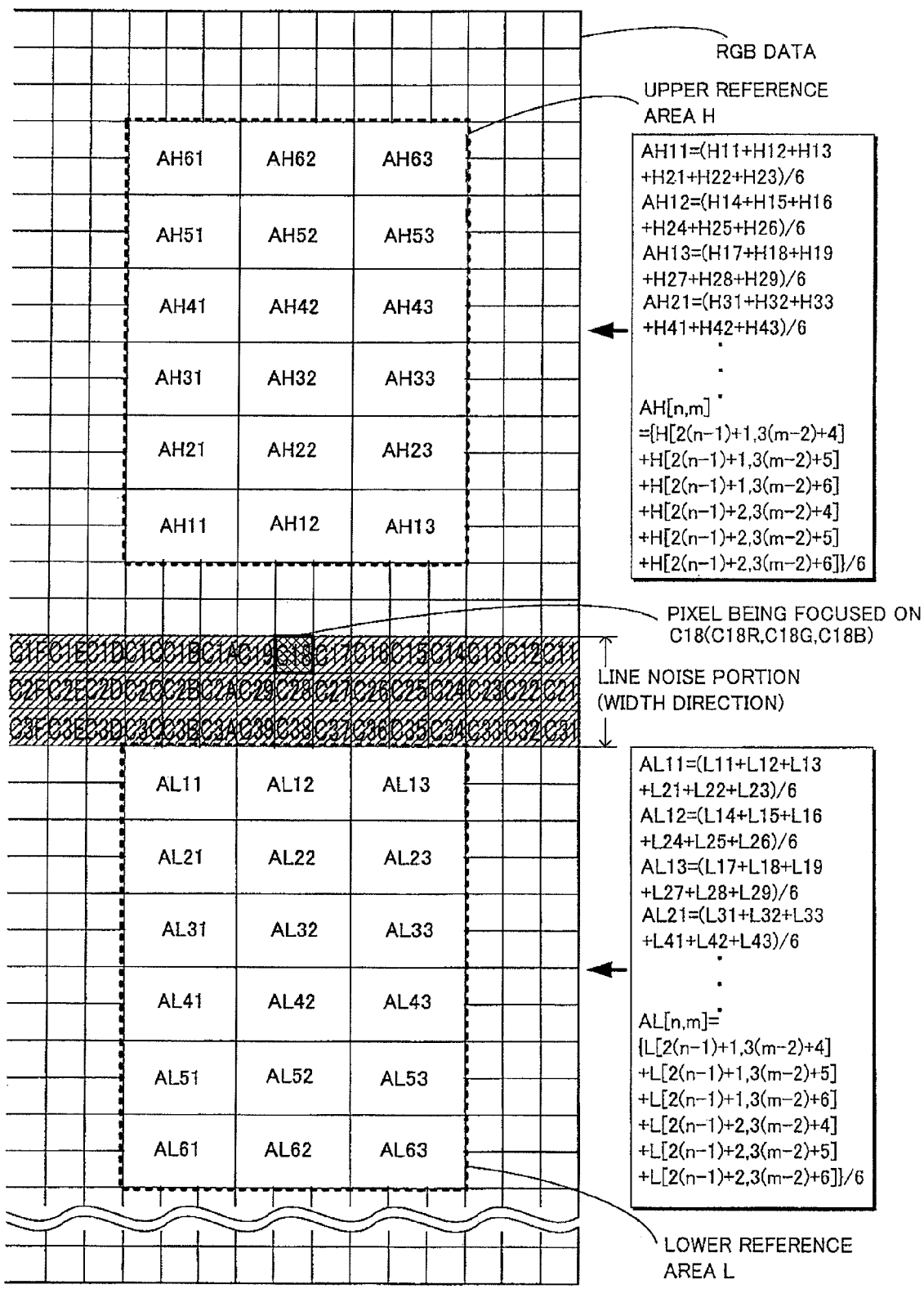
FIG. 13 shows an example of calculating averages for predetermined units of area in the embodiment.

FIG. 13 shows an example of calculating averages for predetermined units of area in the present embodiment.

FIG. 13 shows a condition in which the upper reference area H and lower reference area L shown in FIG. 12 have been divided into a total of 36 areas that are two pixels tall and three pixels wide, and RGB data has been averaged for each of the areas. Specifically, the RGB data for AH11 in FIG. 12 is obtained by averaging the RGB data of the six pixels H11, H12, H13, H21, H22, and H23. The same method is used to obtained averages for the areas AH11 to AH13, AH21 to AH23, AH31 to AH33, AH41 to AH43, AH51 to AH53, AH61 to AH63, AL11 to AL13, AL21 to AL23, AL31 to AL33, AL41 to AL43, AL51 to AL53, and AL61 to AL63. The below expressions 3 and 4 show the above processing described as general expressions.

The upper reference area H is obtained as follows:

$$AH11 = (H11 + H12 + H13 + H21 + H22 + H23)/6 \quad \text{Expression 3}$$

$$AH12 = (H14 + H15 + H16 + H24 + H25 + H26)/6$$

$$AH13 = (H17 + H18 + H19 + h27 + H28 + H29)/6$$

$$AH21 = (H31 + H32 + H33 + H41 + H42 + H43)/6$$

$$\vdots$$

$$AH[n, m] =$$

-continued $$\{H[2(n-1)+1, 3(m-2)+4] + H[2(n-1)+1,$$
$$3(m-2)+5] + H[2(n-1)+1, 3(m-2)+6] +$$
$$H[2(n-1)+2, 3(m-2)+4] + H[2(n-1)+2,$$
$$3(m-2)+5] + H[2(n-1)+2, 3(m-2)+6]\}/6$$

The lower reference area L is obtained as follows:

$$AL11 = (L11 + L12 + L13 + L21 + L22 + L23)/6 \quad \text{Expression 4}$$

$$AL12 = (L14 + L15 + L16 + L24 + L25 + L26)/6$$

$$AL13 = (L17 + L18 + L19 + L27 + L28 + L29)/6$$

$$AL21 = (L31 + L32 + L33 + L41 + L42 + L43)/6$$

$$\vdots$$

$$AL[n, m] = \{L[2(n-1)+1, 3(m-2)+4] +$$
$$L[2(n-1)+1, 3(m-2)+5] +$$
$$L[2(n-1)+1, 3(m-2)+6] + L[2(n-1)+2,$$
$$3(m-2)+4] + L[2(n-1)+2, 3(m-2)+5] +$$
$$L[2(n-1)+2, 3(m-2)+6]\}/6$$

(3) The predetermined units of area in the vicinity of the correction processing target pixel are searched to find an area that has a lowest approximating value that approximates the value of a color component determined to not require correction (step S33).

In the present embodiment, if one or two color components of the correction processing target pixel have been determined to not require correction, the predetermined unit of area whose value of a color component not requiring correction most closely approximates the value of the same color component of the correction processing target pixel is searched for among AH11 to AH13, AH21 to AH23, AH31 to AH33, AH41 to AH43, AH51 to AH53, AH61 to AH63, AL11 to AL13, AL21 to AL23, AL31 to AL33, AL41 to AL43, AL51 to AL53, and AL61 to AL63 shown in FIG. 13. The below shows the above processing described as general expressions.

In C18, C18R is the R component, C18G is the G component, and C18B is the B component. At AH[n,m] (n=1, 2, 3, 4, 5, 6, m=1, 2, 3) the R component is AHnmR, the G component is AHnmG, and the B component is AHnmB. At AL[n,m] (n=1, 2, 3, 4, 5, 6, m=1, 2, 3), the R component is ALnmR, the G component is ALnmG, and the B component is ALnmB.

In a case where only the one color component (R) is determined to not require correction:

$$(C18R-AHnmR) \quad \text{Expression 5}$$

$$(C18R-ALnmR) \quad \text{Expression 6}$$

In this case, the predetermined units of area are searched for AHnm or ALnm for which the results of expression 5 and expression 6 are lowest.

In a case where only the one color component (G) is determined to not require correction:

$$(C18G-AHnmG) \quad \text{Expression 7}$$

$$(C18G-ALnmG) \quad \text{Expression 8}$$

In this case, the predetermined units of area are searched for AHnm or ALnm for which the results of expression 7 and expression 8 are lowest.

In a case where only the one color component (B) is determined to not require correction:

$$(C18B-AHnmB) \quad \text{Expression 9}$$

$$(C18B-ALnmB) \quad \text{Expression 10}$$

In this case, the predetermined units of area are searched for AHnm or ALnm for which the results of expression 9 and expression 10 are lowest.

In a case where the two color components (R) and (G) are determined to not require correction:

$$\sqrt{\{(C18R-AHnmR)^2 + (C18G-AHnmG)^2\}} \quad \text{Expression 11}$$

$$\sqrt{\{(C18R-ALnmR)^2 + (C18G-ALnmG)^2\}} \quad \text{Expression 12}$$

In this case, the predetermined units of area are searched for AHnm or ALnm for which the results of expression 11 and expression 12 are lowest.

In a case where the two color components (R) and (B) are determined to not require correction:

$$\sqrt{\{(C18R-AHnmR)^2 + (C18B-AHnmB)^2\}} \quad \text{Expression 13}$$

$$\sqrt{\{(C18R-ALnmR)^2 + (C18B-ALnmB)^2\}} \quad \text{Expression 14}$$

In this case, the predetermined units of area are searched for AHnm or ALnm for which the results of expression 13 and expression 14 are lowest.

In a case where the two color components (G) and (B) are determined to not require correction:

$$\sqrt{\{(C18G-AHnmG)^2 + (C18B-AHnmB)^2\}} \quad \text{Expression 15}$$

$$\sqrt{\{(C18G-ALnmG)^2 + (C18B-ALnmB)^2\}} \quad \text{Expression 16}$$

In this case, the predetermined units of area are searched for AHnm or ALnm for which the results of expression 15 and expression 16 are lowest.

(4) The correction processing target pixel is corrected using the RGB data of the found area that has the lowest approximating value (step S34). For example, in the case where AH11 has the lowest approximating value, the value of C18R is replaced with the value of AH11R, which is the R data of AH11, the value of C18G is replaced with the value of AH11G, which is the G data of AH11, and the value of C18B is replaced with the value of AH11B, which is the B data of AH11.

Figure 14:
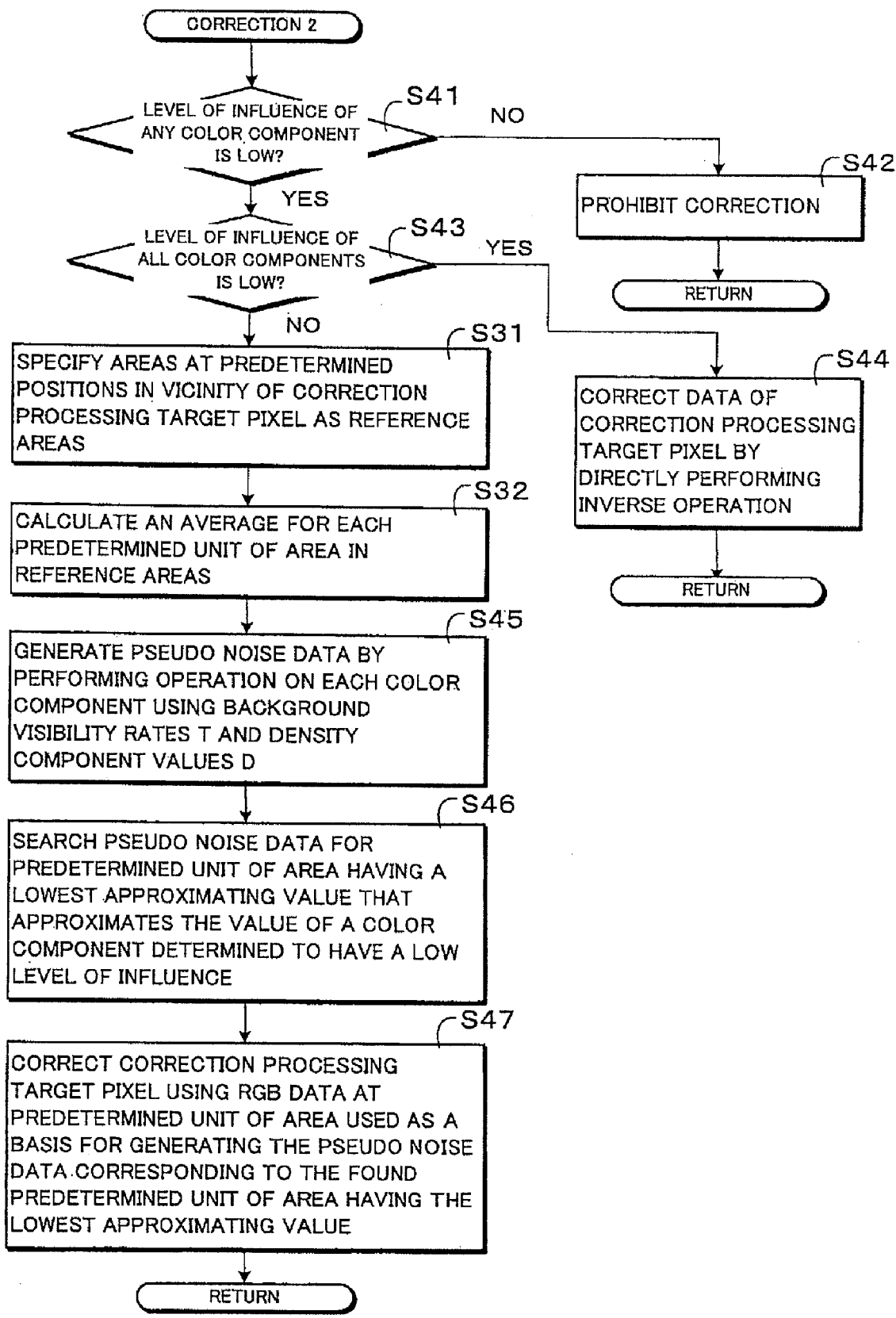
FIG. 14 shows an outline of correction 2 processing.

FIG. 14 shows an outline of correction 2 processing.

The following describes correction 2 processing with reference to FIG. 14.

Note that the steps in correction 2 processing that are the same as in correction 1 processing in FIG. 11 have been given the same reference numbers, and description thereof has been omitted.

(1) For each color component of the correction processing target pixel, a judgment is made as to whether a level of influence indicated by the background visibility rate T is lower than a level of influence indicated by a predetermined specification value, and if the level of influence indicated by the background visibility rate T of one or more color components is judged to be low, correction processing continues (step S41). For example, the level of influence is judged to be high if the background visibility rate T is less than 30%, and the level of influence is judged to be low if the background visibility rate T is 30% or greater.

(2) If the level of influence is not judged to be low for any of the color components, correction is prohibited (step S42).

(3) A judgment is made as to whether the level of influence indicated by the background visibility rate T is low for all color components of the correction processing target pixel (step S43).

(4) If the level of influence for all of the color components is low, the data of the correction processing target pixel is corrected by directly performing an inverse operation on the correction processing target pixel (step S44). Specifically, the inverse operation is performed on each color component of the correction processing target pixel using the background visibility rate T and density component value D in order to simulate a condition in which a dirtiness source does not exist and eliminate the influence of the dirtiness source, thereby correcting the RGB data of the correction processing target pixel. The below shows the above processing described as general expressions.

Here, the post-inverse operation C18 is O18, the R component is O18R, the G component is O18G, and the B component is O18B. The background visibility rate T at the position of C18 is T1, the R component of T1 is T1R, the G component of T1 is T1G, and the B component of T1 is T1B. The density component value D at the position of C18 is D1, the R component of D1 is D1R, the G component of D1 is D1G, and the B component of D1 is D1B.

$$O18R = C18R/T1R - D1R \quad \text{Expression 17}$$

$$O18G = C18G/T1G - D1G \quad \text{Expression 18}$$

$$O18B = C18B/T1B - D1B \quad \text{Expression 19}$$

(5) The same processing as in (1) of the description of FIG. 11 is performed (step S31).

(6) The same processing as in (2) of the description of FIG. 11 is performed (step S32).

(7) If the level of influence of one or more color components is judged to be low, but the level of influence of all of the color components is not judged to be low (i.e., the level of influence of only one or two color components is judged to be low), an operation using the background visibility rate T and density component value D is performed on each color component of the image data of the predetermined units of area that are outside the line noise portion and surround the correction processing target pixel, thus generating pseudo noise data for simulating a state in which a dirtiness source exists (step S45).

Figure 15:
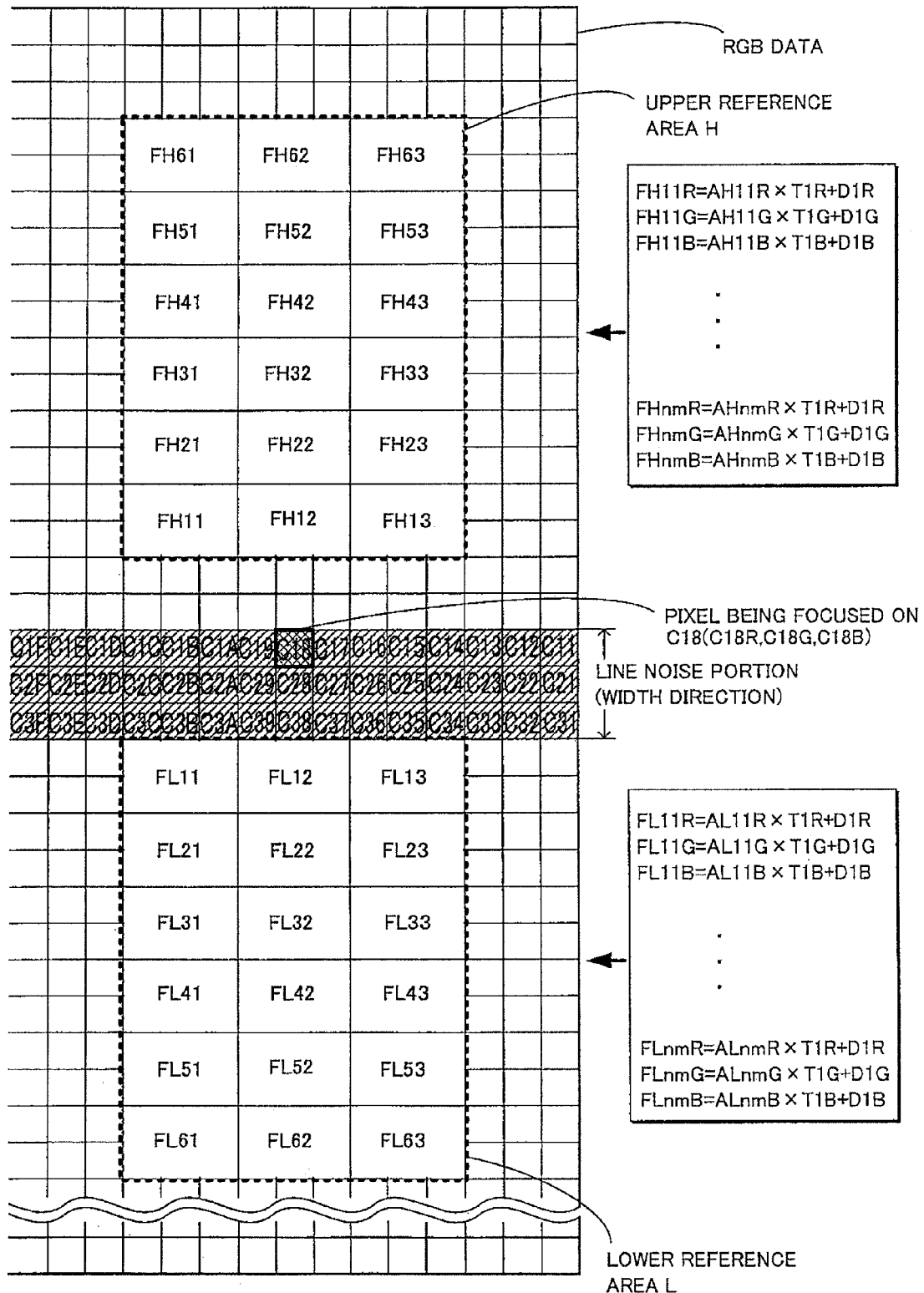
FIG. 15 shows an example of pseudo noise data generation in the embodiment.

FIG. 15 shows an example of pseudo noise data generation in the present embodiment.

FIG. 15 shows a condition in which pseudo noise data has been generated for all 36 blocks of the upper reference area H and lower reference area L shown in FIG. 13. Specifically, for example, an operation is performed on AH11 to AH13, AH21 to AH23, AH31 to AH33, AH41 to AH43, AH51 to AH53, AH61 to AH63, AL11 to AL13, AL21 to AL23, AL31 to AL33, AL41 to AL43, AL51 to AL53, and AL61 to AL63. This operation obtains FH11 to FH13, FH21 to FH23, FH31 to FH33, FH41 to FH43, FH51 to FH53, FH61 to FH63, FL11 to FL13, FL21 to FL23, FL31 to FL33, FL41 to FL43, FL51 to FL53, and FL61 to FL63, which simulate a state in which a dirtiness source does not exist. The below shows the above processing described as general expressions.

At FH[n,m] (n=1, 2, 3, 4, 5, 6, m=1, 2, 3), the R component is FHnmR, the G component is FHnmG, and the B component is FHnmB. At FL[n,m] (not, 2, 3, 4, 5, 6, m=1, 2, 3), the R component is FLnmR, the G component is FLnmG, and the B component is FLnmB.

The upper reference area H is obtained as follows:

$$FH11R = AH11R \times T1R + D1R$$

$$FH11G = AH11G \times T1G + D1G$$

$$FH11B = AH11B \times T1B + D1B$$

$$\vdots$$

$$FHnmR = AHnmR \times T1R + D1R \quad \text{Expression 20}$$

$$FHnmG = AHnmG \times T1G + D1G \quad \text{Expression 21}$$

$$FHnmB = AHnmB \times T1B + D1B \quad \text{Expression 22}$$

The lower reference area L is obtained as follows:

$$FL11R = AL11R \times T1R + D1R$$

$$FL11G = AL11G \times T1G + D1G$$

$$FL11B = AL11B \times T1B + D1B$$

$$\vdots$$

$$FLnmR = ALnmR \times T1R + D1R \quad \text{Expression 23}$$

$$FLnmG = ALnmG \times T1G + D1G \quad \text{Expression 24}$$

$$FLnmB \rightarrow ALnmB \times T1B + D1B \quad \text{Expression 25}$$

(8) The predetermined units of area of the pseudo noise data are searched to find an area that has a lowest approximating value that approximates the value of a color component determined to have a low level of influence (step S46).

In the present embodiment, if one or two color components have been determined to have a low level of influence, the predetermined unit of area whose value of a color component having a low level of influence most closely approximates the value of the same color component of the correction processing target pixel is searched for among FH11 to FH13, FH21 to FH23, FH31 to FH33, FH41 to FH43, FH51 to FH53, FH61 to FH63, FL11 to FL13, FL21 to FL23, FL31 to FL33, FL41 to FL43, FL51 to FL53, and FL61 to FL63 shown in FIG. 15. The below shows the above processing described as general expressions.

In a case where only the one color component (R) is determined to have a low level of influence:

$$(C18R - FHnmR) \quad \text{Expression 26}$$

$$(C18R - FLnmR) \quad \text{Expression 27}$$

In this case, the predetermined units of area are searched for FHnm or FLnm for which the results of expression 26 and expression 27 are lowest.

In a case where only the one color component (G) is determined to have a low level of influence:

$$(C18G - FHnmG) \quad \text{Expression 28}$$

$$(C18G - FLnmG) \quad \text{Expression 29}$$

In this case, the predetermined units of area are searched for FHnm or FLnm for which the results of expression 28 and expression 29 are lowest.

In a case where only the one color component (B) is determined to have a low level of influence:

$$(C18B - FHnmB) \quad \text{Expression 30}$$

$$(C18B - FLnmB) \quad \text{Expression 31}$$

In this case, the predetermined units of area are searched for FHnm or FLnm for which the results of expression 30 and expression 31 are lowest.

In a case where the two color components (R) and (G) are determined to have a low level of influence:

$$\sqrt{\{(C18R-FHnmR)^2+(C18G-FHnmG)^2\}} \qquad \text{Expression 32}$$

$$\sqrt{\{(C18R-FLnmR)^2+(C18G-FLnmG)^2\}} \qquad \text{Expression 33}$$

In this case, the predetermined units of area are searched for FHnm or FLnm for which the results of expression 32 and expression 33 are lowest.

In a case where the two color components (R) and (B) are determined to have a low level of influence:

$$\sqrt{\{(C18R-FHnmR)^2+(C18B-FHnmB)^2\}} \qquad \text{Expression 34}$$

$$\sqrt{\{(C18R-FLnmR)^2+(C18B-FLnmB)^2\}} \qquad \text{Expression 35}$$

In this case, the predetermined units of area are searched for FHnm or FLnm for which the results of expression 34 and expression 35 are lowest.

In a case where the two color components (G) and (B) are determined to have a low level of influence:

$$\sqrt{\{(C18G-FHnmG)^2+(C18B-FHnmB)^2\}} \qquad \text{Expression 36}$$

$$\sqrt{\{(C18G-FLnmG)^2+(C18B-FLnmB)^2\}} \qquad \text{Expression 37}$$

In this case, the predetermined units of area are searched for FHnm or FLnm for which the results of expression 36 and expression 37 are lowest.

(9) The correction processing target pixel is corrected using the RGB data of the predetermined unit of area used as a basis for generating the pseudo noise data that corresponds to the found predetermined unit of area that has the lowest approximating value (step S47). For example, in the case where FH11 has the lowest approximating value, the value of C18R is replaced with the value of AH11R, which is the R data of AH11 that corresponds to FH11, the value of C18G is replaced with the value of AH11G, which is the G data of AH11 that corresponds to FH11, and the value of C18B is replaced with the value of AH11B, which is the B data of AH11 that corresponds to FH11.

Note that in correction 2 processing, even if all of the color components have a low level of influence, rather than performing the correction described in (4), the correction processing target pixel may be corrected using the RGB data of the predetermined unit of area used as a basis for generating the pseudo noise data that corresponds to the found area that has the lowest approximating value, as in (5) to (9).

In the present embodiment, predetermined units of area in the vicinity of the correction processing target pixel are specified as reference areas, an average is calculated for each predetermined unit of area in the reference areas, and a search is performed to find the predetermined unit of area that has a lowest approximating value. However, instead of calculating an average for each predetermined unit of area, the pixels in the reference area may be searched to find the lowest approximating pixel, and the value of such pixel may be used in the subsequent processing.

In Summary

According to the present embodiment, when reading an image of an original by a sheet-through method, a plurality of background plates having mutually different densities are set one by one as backgrounds, an image is read against each of the background plates before the original reaches the reading position to generate correction for each of the background plates, and noise addresses are detected based on correction data. This structure enables substantially increasing the precision of detecting line noise in image data of an original, since the original does not have any influence and detection is not dependent on the color of the debris. Also, a background visibility rate and density component value indicating the influence of the dirtiness source such as debris are calculated based on the correction data for each of the background plates, and line noise is corrected if the background visibility rate is greater than or equal to a predetermined value. Accordingly, even if line noise is generated due debris etc. that simultaneously influences all colors of sensors, the present invention has the superior effect of being able to correct such line noise.

Modification 1

In embodiment 1, a line noise address is detected from image data and correction data for each of the background plates, after which a background visibility rate and density component value are calculated based on a portion of the correction data corresponding to the line noise address. However, in modification 1, a background visibility rate and density component value are calculated based on the correction data for each of the background plates, whereafter a line noise address is detected based on the background visibility rate and density component value.

The following describes the line noise detection processing of modification 1, which is the main difference from embodiment 1.

Line Noise Detection Processing

Figure 16:
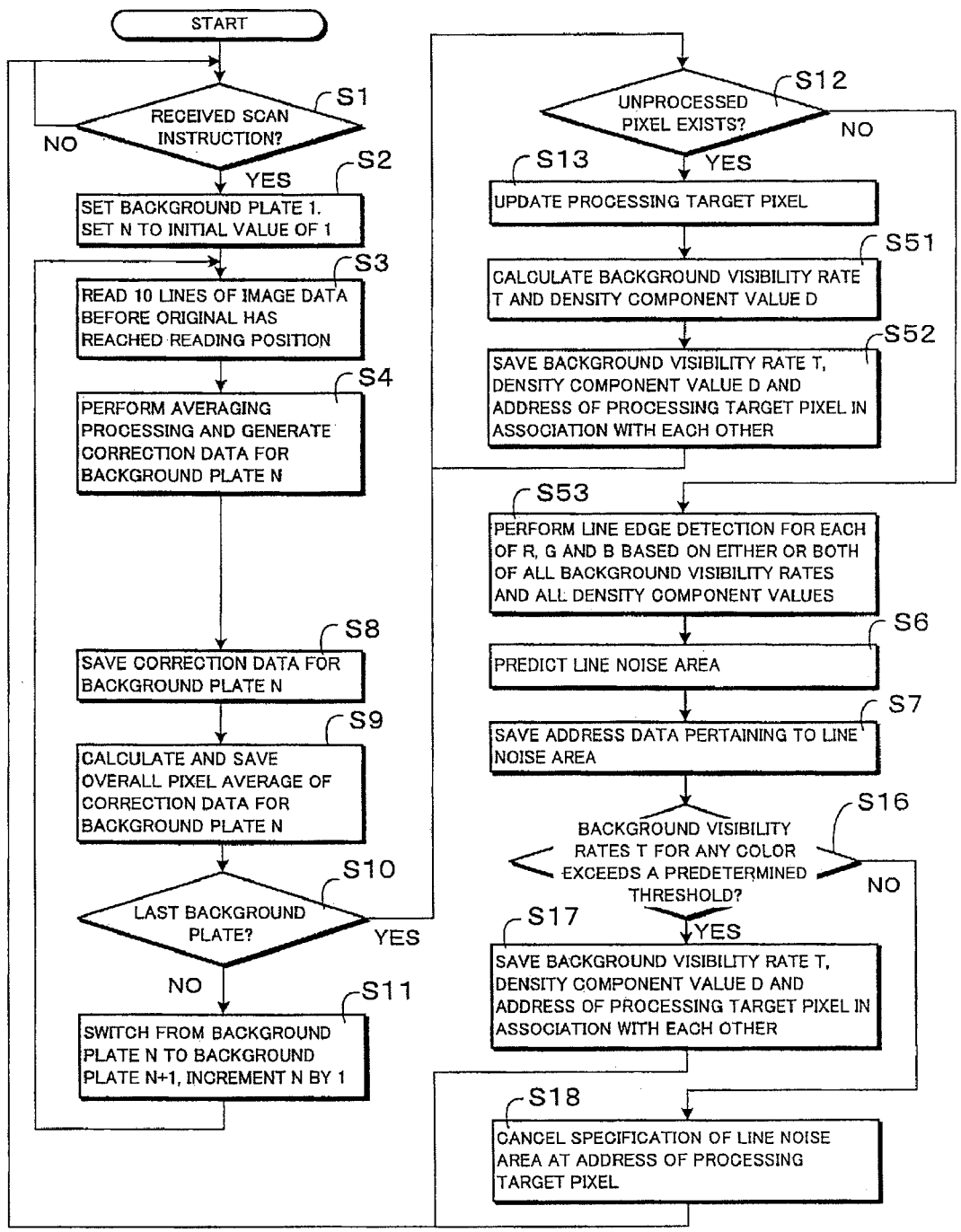
FIG. 16 shows an outline of a preliminary debris detection operation, and steps in correction data generation processing, line noise detection processing, background transmissivity rate T calculation processing, density component value D calculation processing, etc., which are performed by the line noise detector 48 in modification 1.

FIG. 16 shows an outline of preliminary debris detection operation, and steps in correction data generation processing, line noise detection processing, background transmissivity rate T calculation processing, density component value D calculation processing, etc., which are performed by the line noise detector 48 in modification 1.

The following describes the processing performed by the line noise detector 48 etc. with reference to FIG. 16.

Note that the steps in the below processing that are the same as in the processing shown in FIG. 8 in embodiment 1 have been given the same reference numbers, and description thereof has been omitted.

(1 to 4) The same processing as in (1) to (4) of the description of FIG. 8 is performed (steps S1 to S4).

In modification 1, line edge processing is not performed at this time.

(5 to 10) The same processing as in (8) to (13) of the description of FIG. 8 is performed (steps S8 to S13).

(11) A background visibility rate T and density component value D are calculated for a processing target pixel in accordance with, for example, the previously described expressions 1 and 2 (step S51).

(12) The address of the processing target pixel is stored in association with the calculated background visibility rate T and density component value D, and the calculation and storage processing is repeated for the next unprocessed pixel (step S52).

(13) If another unprocessed pixel does not exist, line edge detection is performed for each of R, G, and B based on either or both of all the stored background visibility rates T and all the density component values D (step S53).

In the exemplary case of performing line edge detection based on the background visibility rates, a portion of data having a background visibility rate T less than 95% calculated based on expression 1 is detected as a line edge for each of R, G, and B.

In the exemplary case of performing line edge detection based on the density component values, a portion of data having a density component value D of 10 or more calculated based on expression 2 is detected as a line edge for each of R, G, and B.

(14 and 15) The same processing as in (6) and (7) of the description of FIG. 8 is performed (step S6 and S7).

(16 to 18) The same processing as in (16) to (18) of the description of FIG. 8 is performed.

Note that a program for causing a computer to execute operations such as in embodiment 1 and modification 1 may be recorded on a computer-readable recording medium, and the recording medium can be distributed and be the object of a transaction. Also, the program can be distributed via a network etc. and be the object of a transaction, and furthermore can be displayed on a display device or printed and presented to a user.

There are no particular limitations on the form of computer-readable recording medium. Examples of the computer-readable recording medium include a removable recording medium such as a floppy disk, CD, MO, DVD, or memory card, and a fixed recording medium such as a hard disk or a semiconductor memory.

INDUSTRIAL APPLICABILITY

The present invention is widely applicable to original reading devices that read an original by a sheet-through method. The present invention enables correcting line noise, under a predetermined condition, even if such line noise has appeared due to debris etc. that simultaneously influences all colors of sensors, thereby correcting line noise portions of data more precisely than in conventional technology. The present invention is therefore highly industrially applicable.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An original reading device that moves an original by a sheet-through method and generates image data corresponding to an image of the original, comprising:
    a plurality of background plates having mutually different densities;
    a background plate switcher operable to automatically switch between the plurality of background plates one-by-one and in order, so as to be a background at a reading position in the sheet-through method;
    a reader operable to (i) generate a correction data piece for each of the background plates by, when the original is located away from the reading position, performing an image reading operation each time the switcher switches between the background plates, and (ii) generate the image data by reading the image of the original by the sheet-through method when the original has reached the reading position;
    a detector operable to, based on the correction data pieces for the background plates, detect a noise address indicating a generation position where line noise is generated continuously in a moving direction of the original due to a dirtiness source on an original platen during original reading;
    a calculator operable to calculate a background visibility rate and a density component value based on the correction data pieces for the background plates, the background visibility rate indicating a degree to which a background image can be seen through the dirtiness source inferred to exist at an area of the reading position that corresponds to the detected noise address, and the density component value indicating a value of a component of light that is not influenced by the background image; and
    a corrector operable to correct a line noise portion of the image data with use of the background visibility rate and the density component value, the line noise portion being indicated by the detected noise address.

2. An original reading device that moves an original by a sheet-through method and generates image data corresponding to an image of the original, comprising:
    a plurality of background plates having mutually different densities;
    a background plate switcher operable to automatically switch between the plurality of background plates one-by-one and in order, so as to be a background at a reading position in the sheet-through method;
    a reader operable to (i) generate a correction data piece for each of the background plates by, when the original is located away from the reading position, performing an image reading operation each time the switcher switches between the background plates, and (ii) generate the image data by reading the image of the original by the sheet-through method when the original has reached the reading position;
    a detector operable to, based on the correction data pieces for the background plates, detect a noise address indicating a generation position where line noise is generated continuously in a moving direction of the original due to a dirtiness source on an original platen during original reading;
    a calculator operable to calculate, as an influence value indicating a level of influence of the dirtiness source inferred to exist at an area of the reading position that corresponds to the detected noise address, a background visibility rate and a density component value based on the correction data pieces for the background plates, the background visibility rate indicating a degree to which a background image can be seen through the dirtiness source, and the density component value indicating a value of a component of light that is not influenced by the background image; and
    a corrector operable to correct a line noise portion of the image data with use of the background visibility rate and the density component value, the line noise portion being indicated by the detected noise address, wherein
    the reader generates image data pertaining to full-color color components and generates the correction data pieces for the background plates as data pertaining to full-color color components,
    the calculator calculates the background visibility rate and the density component value for each of the color components, and
    the corrector includes:
    a pseudo noise data generator operable to generate pseudo noise data by performing an operation on each color component of a noise-free portion of the image data with use of the background visibility rate and the density component value, the noise-free portion being a portion of the image data excluding the line noise portion, and the pseudo noise data simulating a state in which the noise-free portion of the image data has been influenced by the dirtiness source;
    a judging part operable to focus on pixels in the line noise portion of the image data one-by-one, and for each color component of the pixel being focused on, judge whether the value indicated by the background visibility rate is lower than a predetermined specified value;
a search part operable to, if the judging part has judged that the value indicated by the background visibility rate for one or more color components of the pixel being focused on is lower than the level of influence indicated by the predetermined specified value, search the pseudo noise data to find a pixel or predetermined unit of area that matches or approximates values of the image data corresponding to the one or more color components whose background visibility rate was judged to be lower than the predetermined specified value; and
a replacing part operable to correct the line noise portion of the image data by replacing all color components of the pixel being focused on with color components of data in the noise-free portion that corresponds to the found pixel or predetermined unit of area.

3. The original reading device of claim 2, wherein
the corrector further includes a prohibiting part operable to prohibit correction if the judging part has judged that none of the values indicated by the background visibility rates for the color components of the pixel being focused on are lower than the predetermined specified value.

4. The original reading device of claim 2, wherein
the plurality of background plates includes a white background plate and a black background plate,
a background visibility rate T and a density component value D are calculated by the calculator, background visibility rate $T$={(data of the line noise portion of the correction data piece for the white background plate)−(data of the line noise portion of the correction data piece for the black background plate)}/{(average data for an entirety of the correction data piece for the white background plate)−(average data for an entirety of the correction data piece for the black background plate)}, density component value $D$={(data of the line noise portion of the correction data piece for the white background plate)−(average data for the entirety of the correction data piece for the white background plate)×background visibility rate $T$}, and the pseudo noise data generator generates the pseudo noise data by performing an operation on each color component of each pixel or predetermined unit of area in the noise-free portion of the image data, the operation being multiplication by the corresponding background visibility rate T and thereafter addition of the corresponding density component value D.

5. The original reading device of claim 2, wherein
the plurality of background plates includes a white background plate and a black background plate,
a background visibility rate T and a density component value D are calculated by the calculator, background visibility rate $T$={(data of the line noise portion of the correction data piece for the white background plate)−(data of the line noise portion of the correction data piece for the black background plate)}/{(average data for a portion of the correction data piece for the white background plate, the portion being in a vicinity of the line noise excluding the line noise portion)−(average data for a portion of the correction data piece for the black background plate, the portion being in a vicinity of the line noise excluding the line noise portion)}, density component value $D$={(data of the line noise portion of the correction data piece for the white background plate)−(average data of the portion of the correction data piece for the white background plate, the portion being in the vicinity of the line noise excluding the line noise portion)× background visibility rate $T$}, and the pseudo noise data generator generates the pseudo noise data by performing an operation on each color component of each pixel in the noise-free portion of the image data, the operation being multiplication by the corresponding background visibility rate T and thereafter addition of the corresponding density component value D.

6. An original reading device that moves an original by a sheet-through method and generates image data corresponding to an image of the original, comprising:
a plurality of background plates having mutually different densities;
a background plate switcher operable to automatically switch between the plurality of background plates one-by-one and in order, so as to be a background at a reading position in the sheet-through method;
a reader operable to (i) generate a correction data piece for each of the background plates by, when the original is located away from the reading position, performing an image reading operation each time the switcher switches between the background plates, and (ii) generate the image data by reading the image of the original by the sheet-through method when the original has reached the reading position;
a detector operable to, based on the correction data pieces for the background plates, detect a noise address indicating a generation position where line noise is generated continuously in a moving direction of the original due to a dirtiness source on an original platen during original reading;
a calculator operable to calculate, as an influence value indicating a level of influence of the dirtiness source inferred to exist at an area of the reading position that corresponds to the detected noise address, a background visibility rate and a density component value based on the correction data pieces for the background plates, the background visibility rate indicating a degree to which a background image can be seen through the dirtiness source, and the density component value indicating value of a component of light that is not influenced by the background image; and
a corrector operable to correct a line noise portion of the image data with use of the background visibility rate and the density component value, that line noise portion being indicated by the detected noise address, wherein
the reader generates image data pertaining to full-color color components and generates the correction data pieces for the background plates as data pertaining to full-color color components,
the calculator calculates the background visibility rate and the density component value for each of the color components, and
the corrector includes:
a judging part operable to focus on pixels in the line noise portion of the image data one-by-one, and for each color component of the pixel being focused on, judge whether the value indicated by the background visibility rate is lower than a predetermined specified value; and
a replacing part operable to, if the judging part has judged that the value indicated by the background visibility rate for all color components of the pixel being focused on is lower than the predetermined specified value, correct the line noise portion of the image data by performing an inverse operation on all color components of the pixel being focused on with use of the background visibility rates and the density component values of the pixel being focused on to eliminate the influence of the dirtiness source.

7. An original reading device that moves an original by a sheet-through method and generates image data corresponding to an image of the original, comprising:
a plurality of background plates having mutually different densities;
a background plate switcher operable to automatically switch between the plurality of background plates one-by-one and in order, so as to be a background at a reading position in the sheet-through method;
a reader operable to (i) generate a correction data piece for each of the background plates by, when the original is located away from the reading position, performing an image reading operation each time the switcher switches between the background plates and (ii) generates the image data by reading the image of the original by the sheet-through method when the original has reached the reading position;
a detector operable to, based on the correction data pieces for the background plates, detect a noise address indicating a generation position where line noise is generated continuously in a moving direction of the original due to a dirtiness source on an original platen during original reading;
a calculator operable to calculate, as an influence value indicating a level of influence of the dirtiness source inferred to exist at an area of the reading position that corresponds to the detected noise address, a background visibility rate and a density component value based on the correction data pieces for the background plates, the background visibility rate indicating a degree to which a background image can be seen through the dirtiness source, and the density component value indicating a value of a component of light that is not influenced by the background image; and
a corrector operable to correct a line noise portion of the image data with use of the background visibility rate and the density component value, the line noise portion being indicated by the detected noise address, wherein
the reader generates image data pertaining to full-color components and generates the correction data pieces for the background plates as data pertaining to full-color color components,
the detector detects a noise address for each of the color components, and
the corrector includes:
a judging part operable to focus on pixels in the line noise portion of the image data one-by-one, and judge whether each color component of the pixel being focused on requires correction, based on the noise addresses for the color components that were detected by the detector;
a first corrector operable to, if the judging part has judged that only part of the color components of the pixel being focused on requires correction, (i) search pixels or predetermined units of area in a vicinity of the pixel being focused on to find a pixel or predetermined unit of area that approximates values of a part of the color components judged to not require correction, and (ii) replace all color components of the pixel being focused on with color components of the found pixel or predetermined unit of area; and
a second corrector operable to, if the judging part has judged that all color components of the pixel being focused on require correction, (i) perform preliminary correction on pixels or predetermined units of area in a vicinity of the pixel being focused on with use of the background visibility rate and the density component value calculated by the calculator to generate preliminary correction data, (ii) search the preliminary correction data to find a pixel or predetermined unit of area that approximates a value of a color component of the pixel being focused on whose background visibility rate indicates a value that is lower than a predetermined specified value, and (iii) replace all color components of the pixel being focused on with color components of the pixel or predetermined unit of area used in the generation of the found pixel or predetermined unit of area.

8. An original reading device that moves an original by a sheet-through method and generates image data corresponding to an image of the original, comprising:
a plurality of background plates having mutually different densities;
a background plate switcher operable to automatically switch between the plurality of background plates one-by-one and in order, so as to be a background at a reading position in the sheet-through method;
a reader operable to (i) generate a correction data piece for each of the background plates by, when the original is located away from the reading position, performing an image reading operation each time the switcher switches between the background plates, and (ii) generate the image data by reading the image of the original by the sheet-through method when the original has reached the reading position;
a calculator operable to calculate a background visibility rate and a density component value based on the correction data pieces for the background plates, the background visibility rate indicating a degree to which a background image can be seen through a dirtiness source inferred to exist at an area of the reading position, and the density component value pertaining to the dirtiness source and indicating a value of a component of light is not influenced by the background image;
a detector operable to, based on at least one of the background visibility rate and the density component value, detect a noise address indicating a generation position where line noise is generated continuously in a moving direction of the original due to the dirtiness source on an original platen during original reading; and
a corrector operable to correct a line noise portion of the image data with use of the background visibility rate, and the density component value, the line noise portion being indicated by the detected noise address.

9. A non-transitory computer-readable recording medium having recorded thereon an original reading program for causing original reading processing to be performed by an original reading device that moves an original by a sheet-through method and that includes a reader that reads the original and generates image data corresponding to an image of the original,
the original reading device comprising:
a plurality of background plates having mutually different densities; and
a background plate switcher operable to automatically switch between the plurality of background plates oneby-one and in order, so as to be a background at a reading position in the sheet-through method, and the original reading program causing the original reading device to perform the steps of:

(i) generating a correction data piece for each of the background plates by, when the original is located away from the reading position, performing an image reading operation each time the switcher switches between the background plates, and (ii) generating the image data by reading the image of the original by the sheet-through method when the original has reached the reading position;

detecting, based on the correction data pieces for the background plates, a noise address indicating a generation position where line noise is generated continuously in a moving direction of the original due to a dirtiness source on an original platen during original reading;

calculating a background visibility rate and a density component value based on the correction data pieces for the background plates, the background visibility rate indicating a degree to which a background image can be seen through the dirtiness source inferred to exist at an area of the reading position that corresponds to the detected noise address, and the density component value indicating a value of a component of light that is not influenced by the background image; and correcting a line noise portion of the image data with use of the background visibility rate and the density component value, the line noise portion being indicated by the detected noise address.

10. A non-transitory computer-readable recording medium having recorded thereon an original reading program for causing original reading processing to be performed by an original reading device that moves an original by a sheet-through method and that includes a reader that reads the original and generates image data corresponding to an image of the original, the original reading device comprising:

a plurality of background plates having mutually different densities; and a background plate switcher operable to automatically switch between the plurality of background plates one-by-one and in order, so as to be a background at a reading position in the sheet-through method, and the original reading program causing the original reading device to perform the steps of:

(i) generating a correction data piece for each of the background plates by, when the original is located away from the reading position, performing an image reading operation each time the switcher switches between the background plates, and (ii) generating the image data by reading the image of the original by the sheet-through method when the original has reached the reading position;

calculating a background visibility rate and a density component value based on the correction data pieces for the background plates, the background visibility rate indicating a degree to which a background image can be seen through a dirtiness source inferred to exist at an area of the reading position, and the density component value pertaining to the dirtiness source and indicating a value of a component of light that is not influenced by the background image;

detecting, based on at least one of the background visibility rate and the density component value, a noise address indicating a generation position where line noise is generated continuously in a moving direction of the original due to the dirtiness source on an original platen during original reading; and correcting a line noise portion of the image data with use of the background visibility rate and the density component value, the line noise portion being indicated by the detected noise address.

11. An original reading method used in an original reading device that moves an original by a sheet-through method and that includes a reader that reads the original and generates image data corresponding to an image of the original, the original reading device comprising:

a plurality of background plates having mutually different densities; and a background plate switcher operable to automatically switch between the plurality of background plates one-by-one and in order, so as to be a background at a reading position in the sheet-through method, and the original reading method comprising the steps of:

(i) generating a correction data piece for each of the background plates by, when the original is located away from the reading position, performing an image reading operation each time the switcher switches between the background plates, and (ii) generating the image data by reading the image of the original by the sheet-through method when the original has reached the reading position;

detecting, based on one or both of the image data and the correction data pieces for the background plates, a noise address indicating a generation position where line noise is generated continuously in a moving direction of the original due to a dirtiness source on an original platen during original reading;

calculating a background visibility rate and a density component value based on the correction data pieces for the background plates, the background visibility rate indicating a degree to which a background image can be seen through the dirtiness source inferred to exist at an area of the reading position that corresponds to the detected noise address and the density component value indicating a value of a component of light that is not influenced by the background image; and correcting a line noise portion of the image data with use of the influence value, the line noise portion being indicated by the detected noise address.

12. An original reading method used in an original reading device that moves an original by a sheet-through method and that includes a reader that reads the original and generates image data corresponding to an image of the original, the original reading device comprising:

a plurality of background plates having mutually different densities; and a background plate switcher operable to automatically switch between the plurality of background plates one-by-one and in order, so as to be a background at a reading position in the sheet-through method, and the original reading method comprising the steps of:

(i) generating a correction data piece for each of the background plates by, when the original is located away from the reading position, performing an image reading operation each time the switcher switches between the background plates, and (ii) generating the image data by reading the image of the original by the sheet-through method when the original has reached the reading position;

calculating a background visibility rate and a density component value based on the correction data pieces for the background plates, the background visibility rate indicating a degree to which a background image can be seen through a dirtiness source inferred to exist at an area of the reading position, and the density component value pertaining to the dirtiness source and indicating a value of a component of light that is not influenced by the background image;

detecting, based on at least one of the background visibility rate and the density component value, a noise address indicating a generation position where line noise is generated continuously in a moving direction of the original due to the dirtiness source on an original platen during original reading; and correcting a line noise portion of the image data with use of the background visibility rate and the density component value, the line noise portion being indicated by the detected noise address.

13. The original reading device of claim 1, wherein
the reader generates image data pertaining to full-color color components and generates the correction data pieces for the background plates as data pertaining to full-color color components,
the calculator calculates the background visibility rate and the density component value for each of the color components, and
the corrector corrects the line noise portion of the image data with use of the background visibility rate and the density component value for each of the color components, the line noise portion being indicated by the detected noise address.

14. The original reading device of claim 8, wherein
the reader generates image data pertaining to full-color color components and generates the correction data pieces for the background plates as data pertaining to full-color color components,
the calculator calculates the background visibility rate and the density component value for each of the color components, and
the corrector corrects the line noise portion of the image data with use of the background visibility rate and the density component value for each of the color components, the line noise portion being indicated by the detected noise address.

15. The non-transitory computer-readable recording medium of claim 9, wherein
the reader generates image data pertaining to full-color color components,
the correction data pieces for the background plates are generated as data pertaining to full-color color components,
the background visibility rate and the density component value are calculated for each of the color components, and
the line noise portion of the image data is corrected with use of the background visibility rate and the density component value for each of the color components, the line noise portion being indicated by the detected noise address.

16. The non-transitory computer-readable recording medium of claim 10, wherein
the reader generates image data pertaining to full-color color components,
the correction data pieces for the background plates are generated as data pertaining to full-color color components,
the background visibility rate and the density component value are calculated for each of the color components, and
the line noise portion of the image data is corrected with use of the background visibility rate and the density component value for each of the color components, the line noise portion being indicated by the detected noise address.

17. The original reading method of claim 11, wherein
the reader generates image data pertaining to full-color color components,
the correction data pieces for the background plates are generated as data pertaining to full-color color components,
the background visibility rate and the density component value are calculated for each of the color components, and
the line noise portion of the image data is corrected with use of the background visibility rate and the density component value for each of the color components, the line noise portion being indicated by the detected noise address.

18. The original reading method of claim 12, wherein
the reader generates image data pertaining to full-color color components,
the correction data pieces for the background plates are generated as data pertaining to full-color color components,
the background visibility rate and the density component value are calculated for each of the color components, and
the line noise portion of the image data is corrected with use of the background visibility rate and the density component value for each of the color components, the line noise portion being indicated by the detected noise address.

* * * * *